INVENTOR.
JOHN K. McGEE,
BY Wolfe, Hubbard, Voit & Osann
ATTORNEYS.

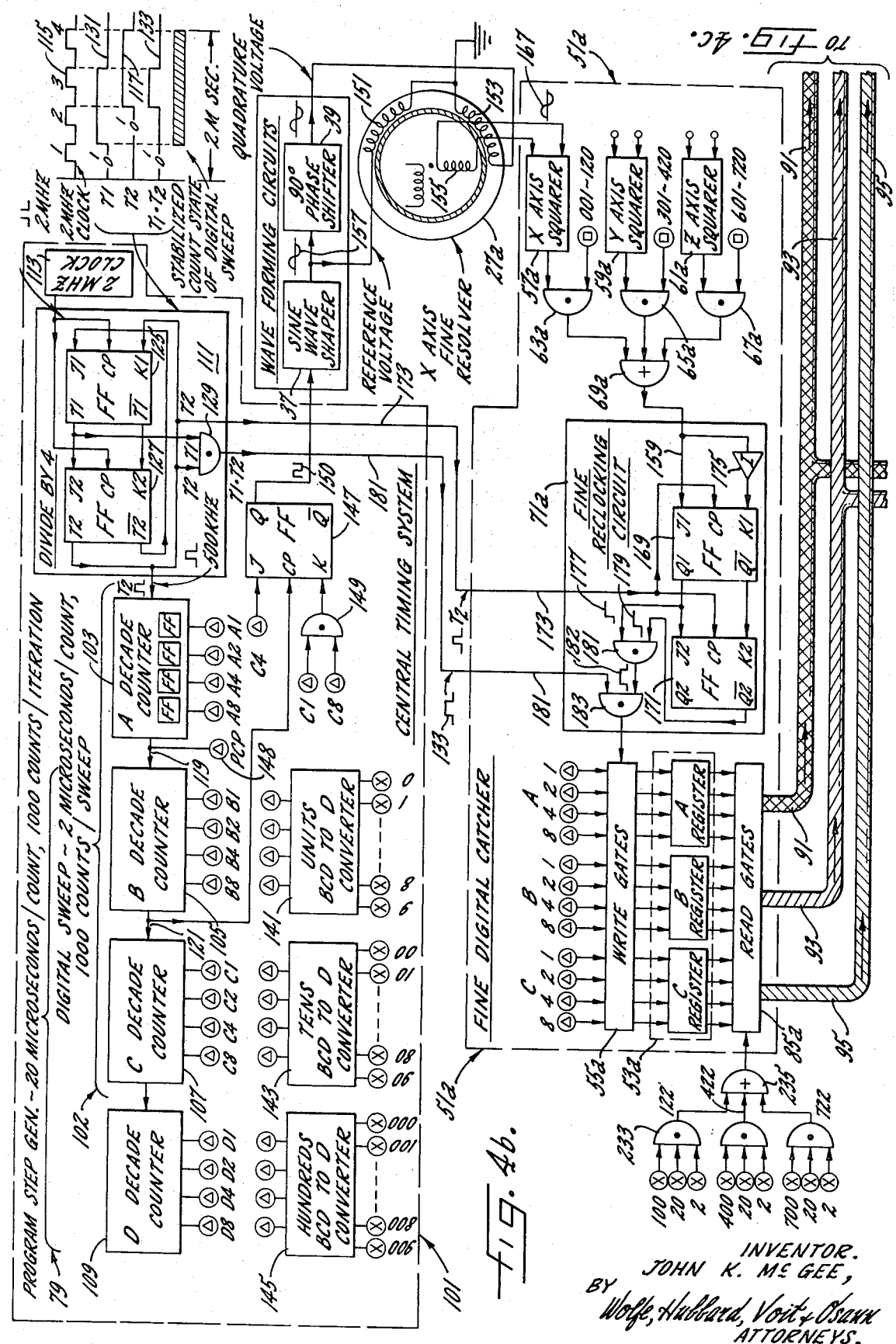

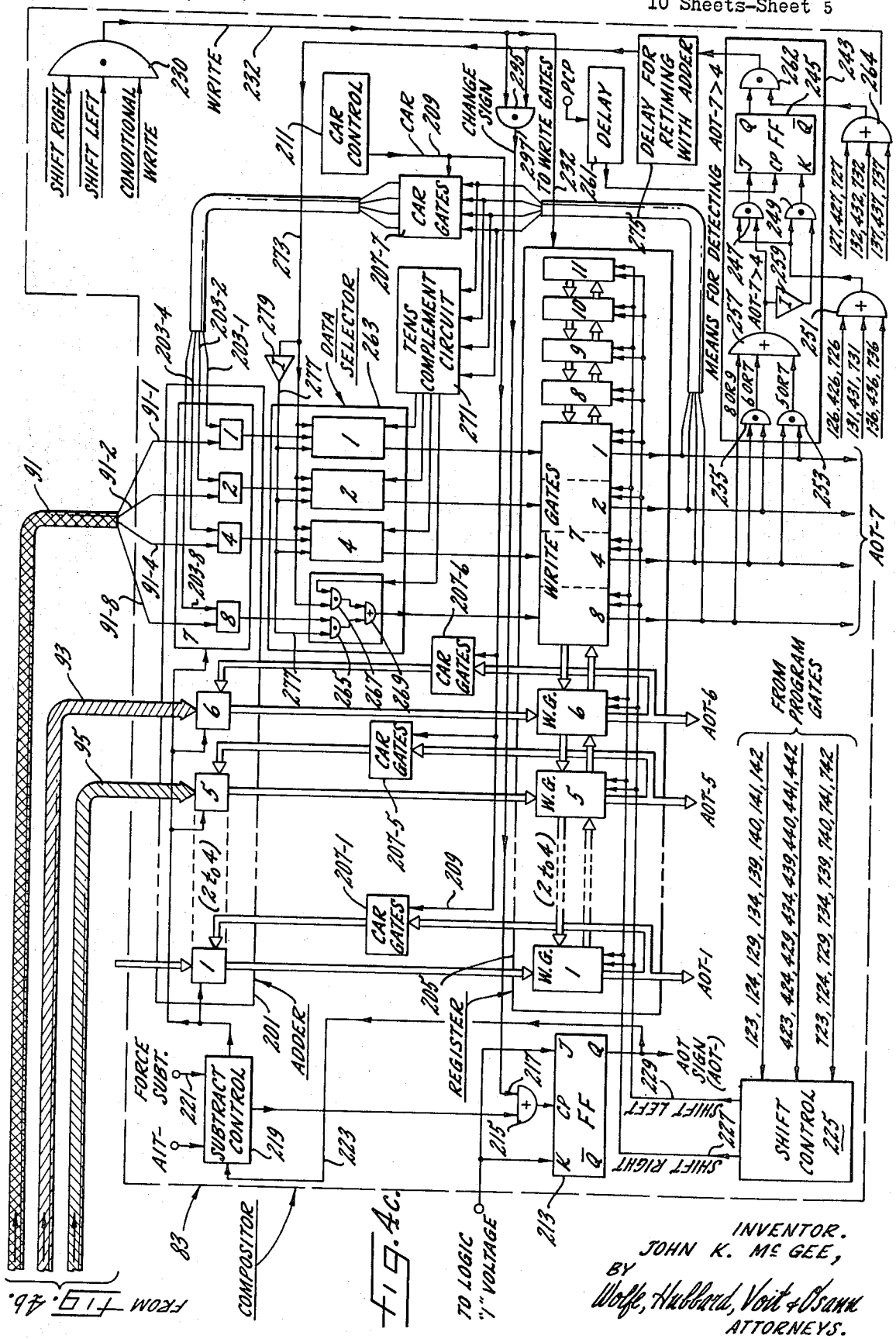

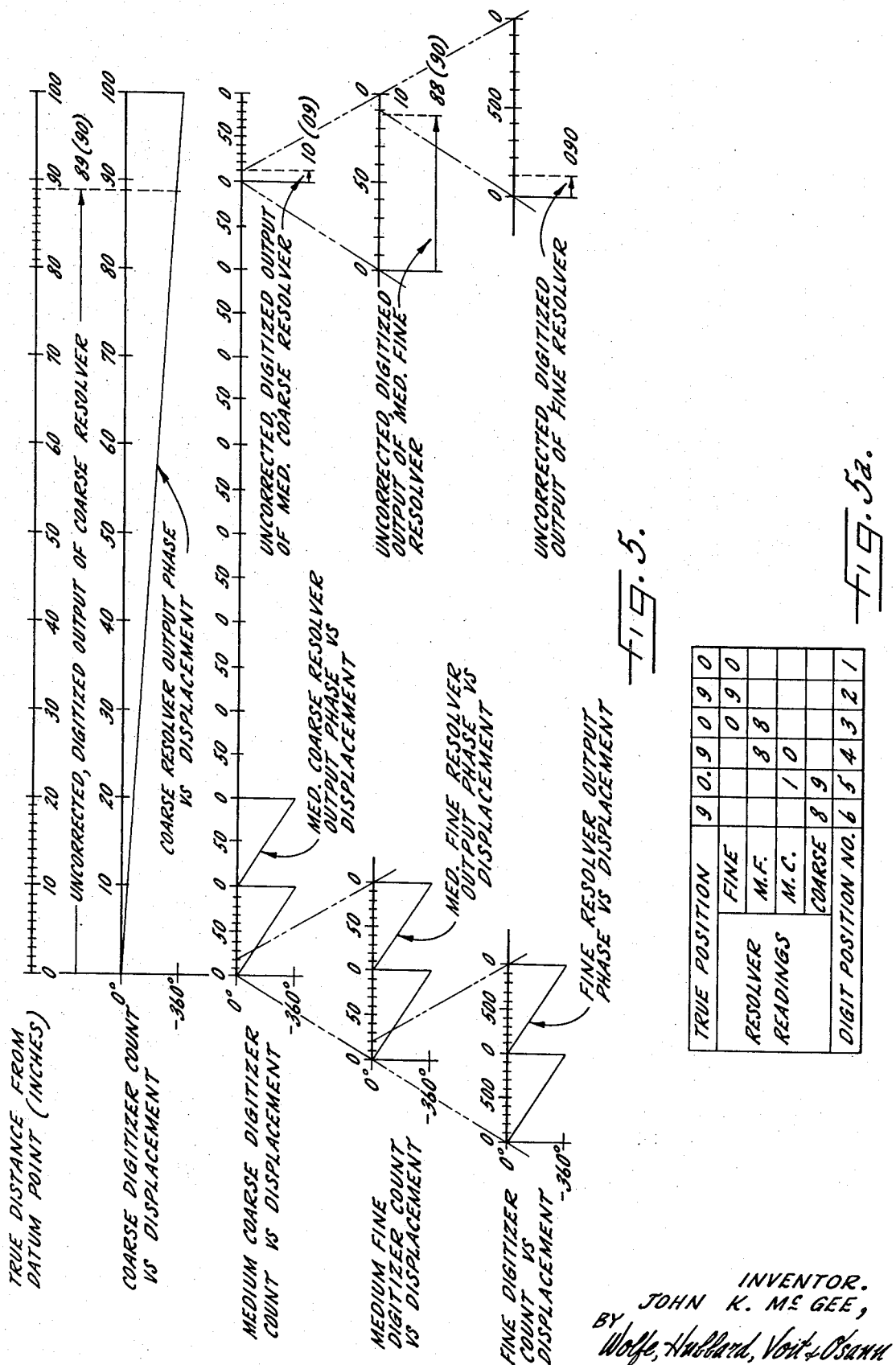

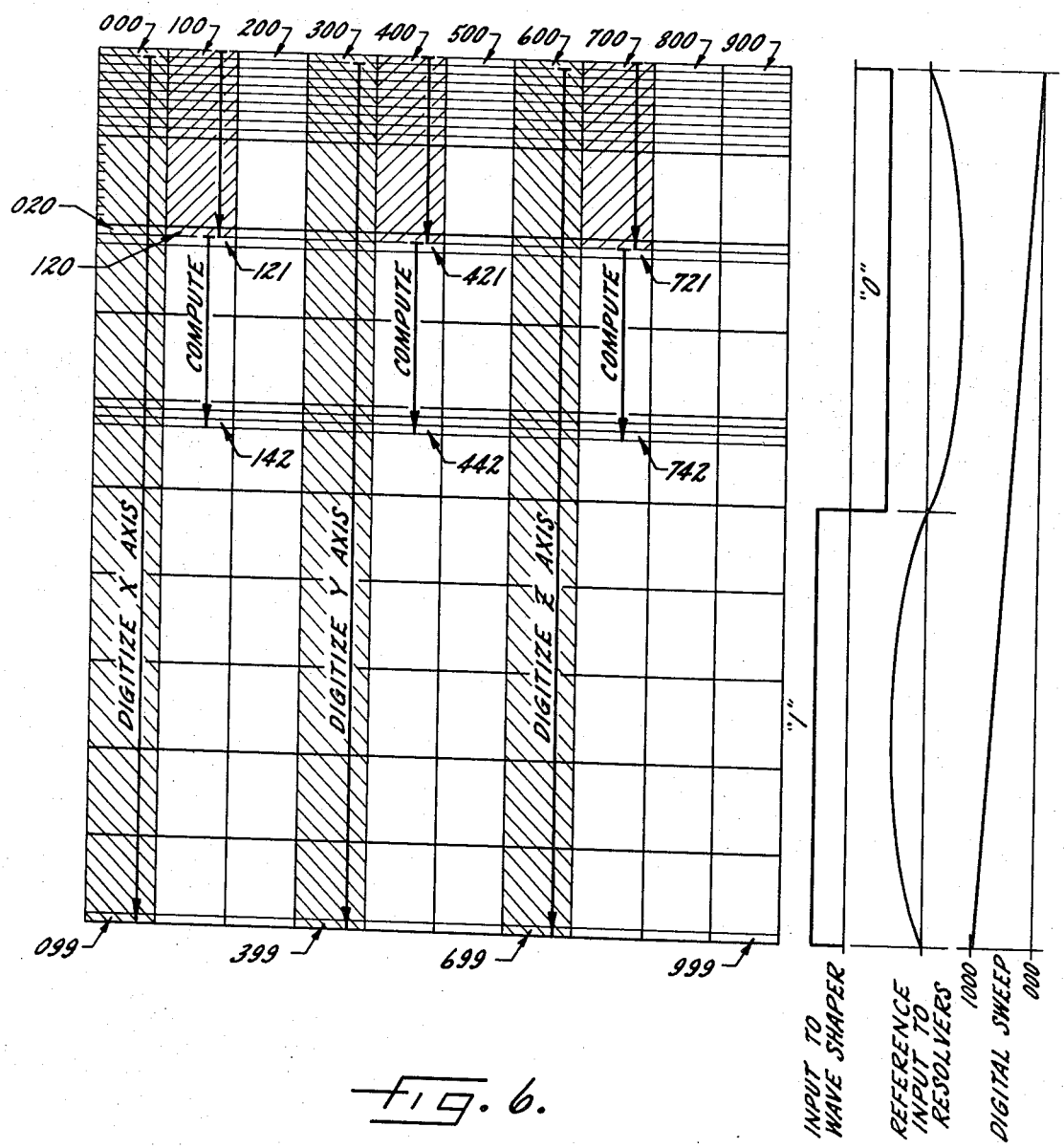

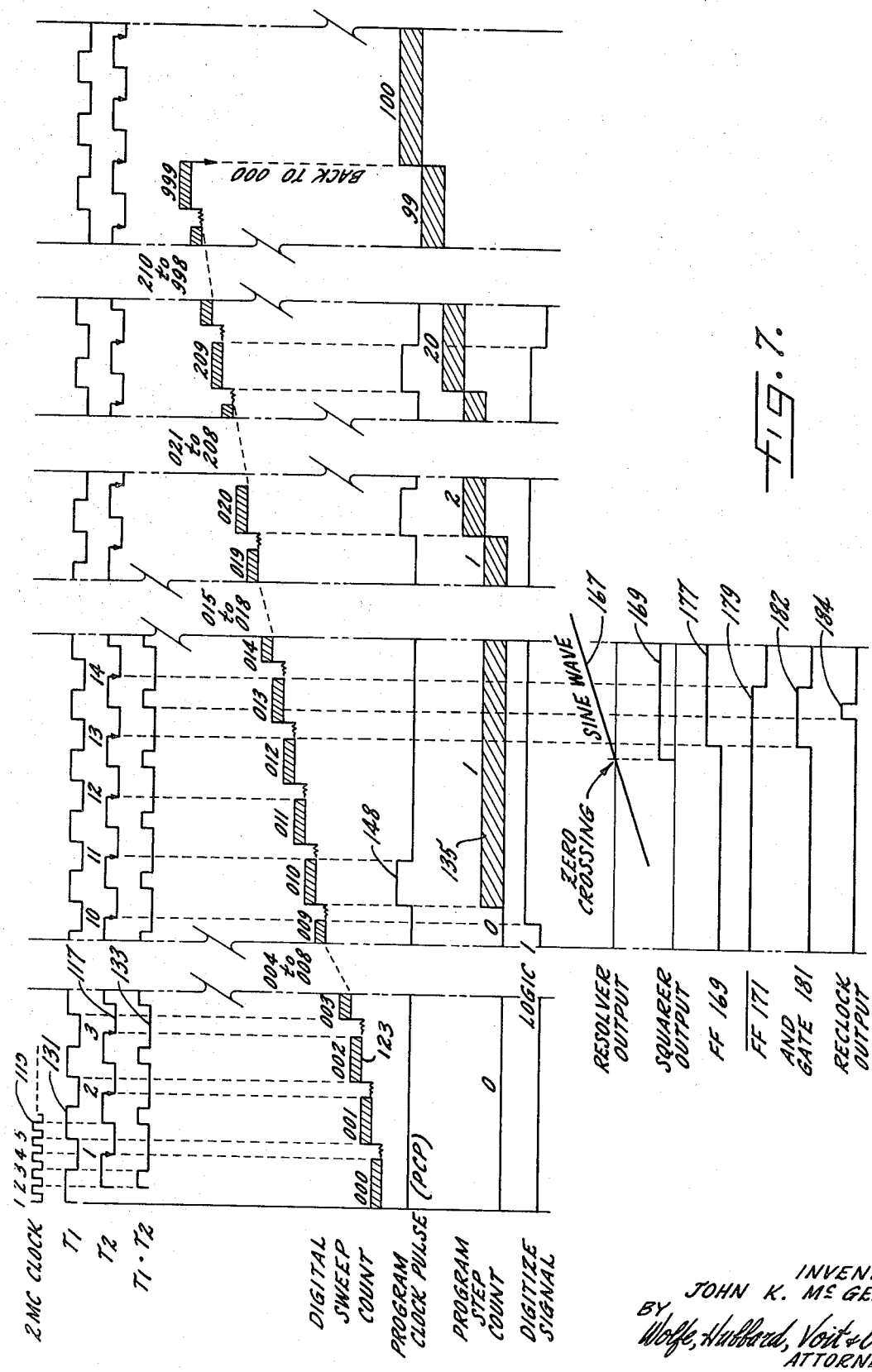

Nov. 10, 1970
J. K. McGEE
3,539,788
METHOD AND SYSTEM FOR DIGITALLY SIGNALING ABSOLUTE POSITION
Filed Feb. 27, 1967
10 Sheets-Sheet 10
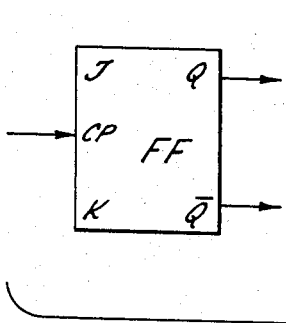
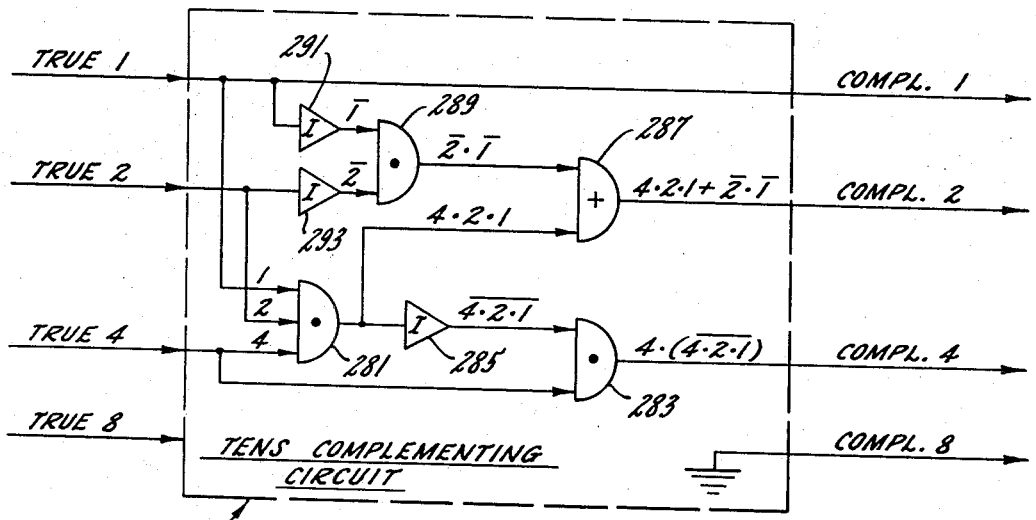
Fig. 8.
Fig. 9.
INVENTOR.
JOHN K. McGEE,
BY
Wolfe, Hubbard, Voit & Osann
ATTORNEYS.

United States Patent Office 3,539,788
Patented Nov. 10, 1970

3,539,788
METHOD AND SYSTEM FOR DIGITALLY SIGNALING ABSOLUTE POSITION
John K. McGee, Houston, Tex., assignor to Giddings & Lewis, Inc., Fond du Lac, Wis., a corporation of Wisconsin
Filed Feb. 27, 1967, Ser. No. 618,667
Int. Cl. H03k 13/00
U.S. Cl. 235—154    19 Claims

TABLE OF CONTENTS

| | |
|---|---|
| ABSTRACT OF THE DISCLOSURE | 1 |
| BACKGROUND OF THE INVENTION | 2 |
| OBJECTS OF THE INVENTION | 2 |
| BRIEF DESCRIPTION OF THE DRAWINGS | 2 |
| AN EXEMPLARY MACHINE TOOL | 3 |
| THE DIGITAL POSITION SIGNALING SYSTEM IN GENERAL | 4 |
| THE DIGITAL POSITION SIGNALING SYSTEM IN DETAIL | 10 |
| (1) The Central Timing System | 10 |
| (a) Producing the digital sweep | 10 |
| (b) Producing gating pulses to assure utilization of the digital sweep while its count states are stable | 11 |
| (c) Generating the program steps | 13 |
| (d) Synchronizing the resolvers | 15 |
| (2) Producing the Position Indicative Phase Variable Analog Signals | 15 |
| (3) Capturing numbers signaled by the Digital Sweep Generator (The Digital Catchers) | 16 |
| (a) In general | 16 |
| (b) The fine reclocking circuit | 17 |
| (c) Time sharing the digital catchers | 19 |
| (d) Extending the digitizing time periods to allow for high resolver speeds | 21 |
| 4. Combining Numbers Stored in the Several Digital Catchers (The Compositor Unit) | 22 |
| (a) The method | 22 |
| (b) The apparatus—a detailed description | 27 |
| (c) Operation of the apparatus in performing the method | 30 |
| CONCLUSION | 41 |

ABSTRACT OF THE DISCLOSURE

A time-shared system for sequentially digitizing the outputs of several sets of resolvers, each set collectively representing the absolute position of movable elements along different axes. A regularly recurring digital sweep is synchronized with the power used to energize the resolvers of each set, respective resolvers of each set producing recurring signals whose phases relative to that of the digital sweep represent the positions of the movable elements within successive ranges which are integral multiples (and sub-multiples) of each other.

The outputs of resolvers representing positions in corresponding ranges along the several axes are applied to separate inputs of a common, time-shared gated storage device in which there are written successive sweeps of the digital sweep generator, each at the instant when the outputs of respective resolvers cross zero in a certain direction. In this manner there appear, in a group of such time-shared storage devices, during each of several successive, recurring time periods, a series of digitally signaled numbers respectively representing the position of the movable elements within different ranges associated with a given axis and with the lowest order digit of the number representing position within a given range corresponding in digital significance to the highest order digit of the number representing position within the next smaller series of ranges along the same axis.

During successive time intervals, each following the digitizing of signals representing the movable elements' position along respective ones of the several axes, the digitally signaled numbers then in the group of storage devices are sequentially transferred to a time-shared compositor unit which includes a digital adder, in order of numbers representing position along successively coarser ranges. Digits of corresponding significance are compared as each next coarser range number is transferred. From the highest order digit of the first received number there is subtracted the lowest order digit of the next received number. If the remainder is greater than 4, the last received number is altered in an opposite sense to the sign of the remainder until the corresponding order digits are equal. If the remainder is not greater than 4, the last received number is altered in the same sense as the sign of the remainder until the corresponding order digits are equal. Composite numbers representative of the position of the movable elements within several ranges along several axes are thus formed during successive time intervals for subsequent utilization.

BACKGROUND OF THE INVENTION

In numerically controlled positioning systems such as those used on machine tools, digitally signaled numerical data representing desired and actual instantaneous position are fed to a servomechanism which compares the data and produces motion in a direction and at a velocity which tends to bring actual position into conformance with desired position. The ultimate object of such systems is to reduce error to a minimum, i.e., to continue to move the controlled movable elements so that its actual position agrees accurately with the position which it is commanded to have at all times. Accurate numerical indication therefore of the actual position of the controlled movable element sometimes to ten thousandths of an inch is a necessity.

In a typical numerically controlled machine tool, motion is to be produced on several axes and therefore position of one or more movable machine elements must be accurately represented in numerical form along each of such axes. It is to the generation of absolute position representative digitally signaled data that the present invention is directed.

OBJECTS OF THE INVENTION

A general object of the invention is to produce a series of recurring signals whose phases relative to a reference signal represent the position of a given object along a given line within successively larger ranges, each of which includes an integral number of the next smaller range laid end to end, to convert these signals by the use of a common digital sweep generator into separately stored, multi-digit numbers representative of the respective signals, and to combine these numbers into a single composite number representing the true absolute position of the object within the full range of travel of the object.

Another related object of the invention is to reduce the amount of equipment required to convert the outputs of several resolvers, (or other equivalent devices which indicate position by a variable phase signal), each signaling the position of a movable element along a different axis (or signaling the positions of different movable elements) into individual, digitally signaled numbers.

It is a further object to convert the output of a rotary resolver into a digitally signaled number reliably, even when the resolver's revolution rate is so high that the resolver's output signal frequency is altered.

Yet another object of the invention is to provide a time-shared digitizing system which converts the time-phased outputs of several sets of resolvers, resolvers of respective sets collectively representing the position of a movable element along respective axes (or the positions of several movable elements) into digitally signaled composite numbers, one for each set of resolvers, during successive, regularly recurring time periods.

BRIEF DESCRIPTION OF THE DRAWINGS

Other objects and advantages will become apparent as the following description proceeds, taken in conjunction with the following drawings in which:

FIGS. 5, 5a are sets of wave forms to illustrate the phase variable signals produced in and converted by the system shown in FIGS. 2 and 4;

FIG. 6 is a programming chart designed to illustrate the time periods during which phase variable signals representing position along different axes are converted into digital numbers;

FIG. 7 is a second set of wave forms principally to illustrate the time relationships of pulses produced by components of the system shown in FIGS. 2 and 4;

FIG. 8 is a "truth table" for illustrating the mode of operation of a well-known type of flip-flop used throughout the system illustrated in FIGS. 2 and 4; and FIG. 9 is a block and line diagram of a tens complement circuit used in the compositor unit shown in FIG. 4c.

While the invention has been shown and will be described in some detail with reference to a preferred embodiment thereof, there is no intention that it thus be limited to such detail. On the contrary, it is intended here to cover all modifications, alternatives, and equivalents falling within the spirit and scope of the invention as defined by the appended claims.

AN EXEMPLARY MACHINE TOOL

Figure 1:
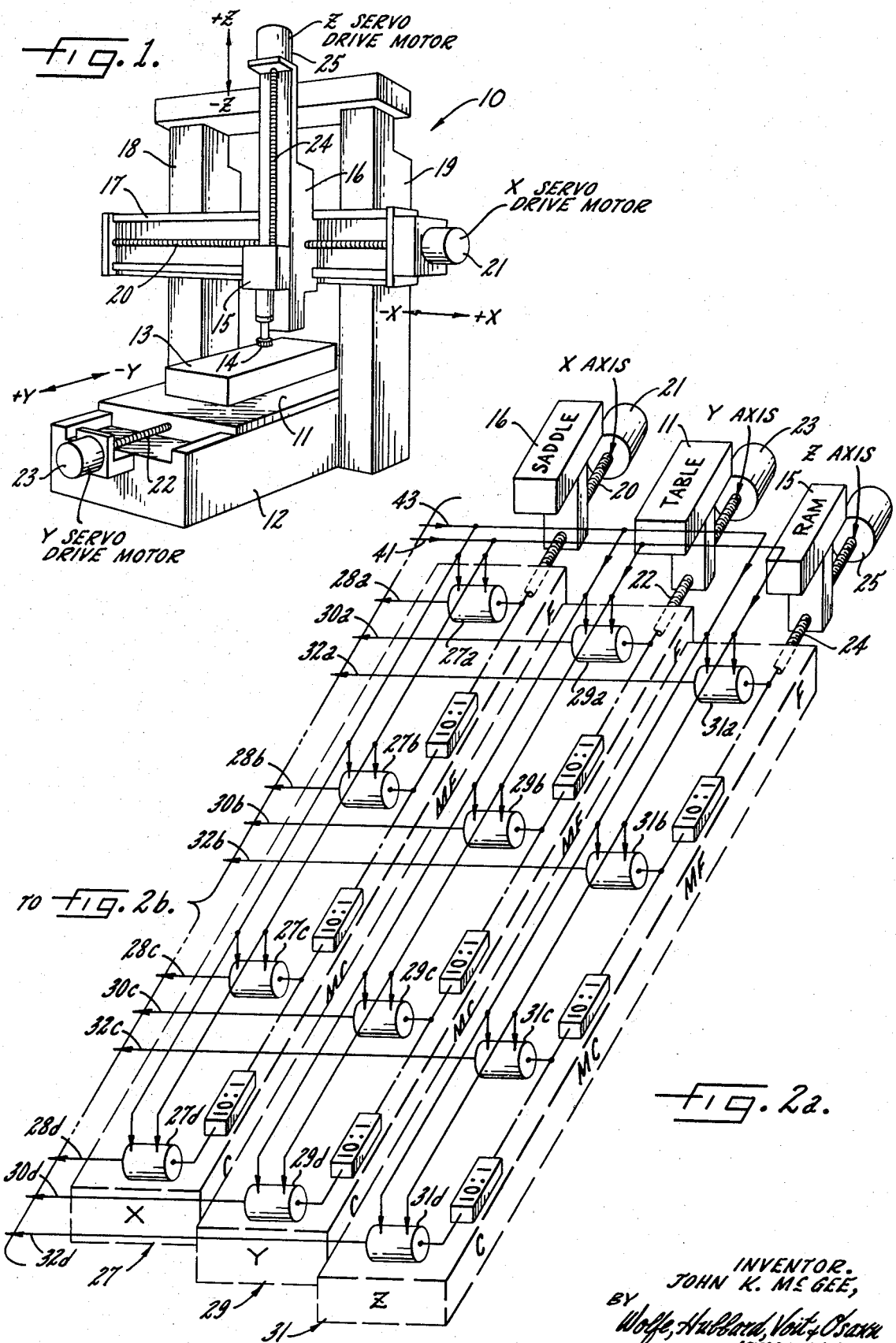
FIG. 1 is a perspective view of a milling machine shown to provide one example of a typical application of features of the invention.

In order to illustrate a particular environment in which the present invention will find especially advantageous use, it will be described here with reference to digitally signaling the position of elements of a numerically controlled milling machine along three mutually orthogonal axes. A milling machine 10 (shown in FIG. 1) is typical of the many different types of machine tools which may be numerically controlled and whose numerical control requires digital position signals for operation. The exemplary milling machine includes a work table 11, movable horizontally along a bed 12 and adapted to carry a workpiece 13 which is to be machined. A milling tool 14 is mounted on and vertically movable with a ram 15 which is slidable within vertical ways (not shown) formed on a saddle 16, the latter in turn being movable horizontally along the ways of a rail 17 which is supported at its opposite ends by spaced columns 18 and 19. The milling tool 14 may thus be moved along horizontal and vertical X and Z axes relative to the workpiece 13 which in turn may be moved along a Y horizontal axis at right angles to the X horizontal axis.

By proper proportioning of the X, Y, and Z axis components of movement and velocity, the milling tool 14 moves through the workpiece 13 along a path and at a depth to cut a desired contour thereon. To produce such controlled movement of the workpiece 13 and the milling tool 14, the saddle 16 includes a nut (not shown) engaged with a lead screw 20 driven through suitable gears (not shown) by a reversible servomotor 21. As the latter motor is caused to rotate in one direction or the other at different speeds, the saddle 16 will be moved horizontally in +X or —X directions and at velocities determined by the speed of the motor. Correspondingly, the ram 15 carries a nut (not shown) engaged with a vertically disposed lead screw 24 driven by a reversible servomotor 25 so that energization of that motor in one direction or the other moves the milling tool 14 in +Z or —Z directions. Finally, the table 11 also carries a nut (not shown) which is engaged with a second horizontally disposed lead screw 22 driven by a reversible servomotor 23 whereby the table 11 and the workpiece 13 thereon may be moved in +Y or —Y direction.

THE DIGITAL POSITION SIGNALING SYSTEM IN GENERAL

Figure 2:
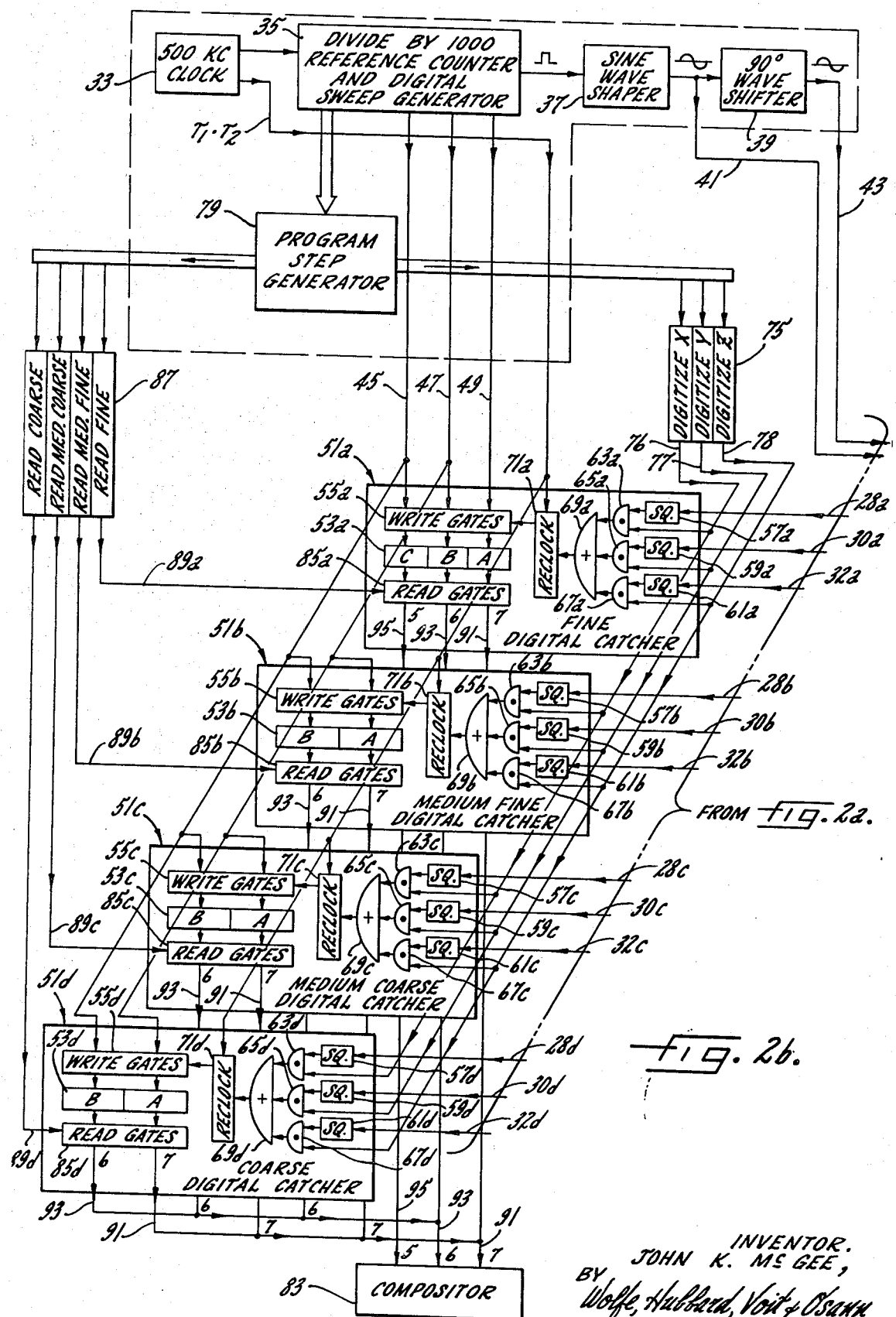
FIG. 2 formed of FIGS 2a–2b when joined together as indicated thereon, is a general block diagram of a digitizing system embodying features of the invention.

An illustrative embodiment of a system incorporating features of the invention is shown in FIG. 2 which is formed of FIGS. 2a and 2b joined as indicated thereon. By means of the illustrated system, the position of the milling tool 14 along the X and Z axes and the position of the workpiece 13 along the Y axis are initially indicated in the form of phase variable analog signals. For sake of example, these signals are shown to be generated by a particularly well-known type of synchronous induction device, the resolver. Three sets of resolvers 27, 29, and 31 are provided, each for producing position along a respective one of the X, Y, and Z axes. The phase variable outputs of the respective sets of resolvers are successively converted into series of digital numbers which are then combined to form for each set of resolvers a composite digital number representative of position along the axis with which that set of resolvers is associated.

In the illustrative embodiment of the system, there are four resolvers in each of the three sets 27, 29, and 31. Taking the X axis resolvers as an example, successive ones of the resolvers in the set are geared by means of gears labeled "10:1" to rotate at a fraction, one tenth, of the rate at which the preceding resolver in the set revolves. In order of diminishing relative rate of rotation, the resolvers are referred to as the fine resolver 27a, the medium fine resolver 27b, the medium coarse resolver 27c, and the coarse resolver 27d. Let it be assumed that the fine resolver 27a is so geared to the X axis lead screw 20 (by means not shown) that the rotor of the resolver rotates through 360° for each .1 inch of movement of the tool 14. It follows then that the medium fine, medium coarse, and coarse resolvers 27b, 27c, and 27d will turn through a 360° angle for each inch, ten inches, and one hundred inches of movement of the milling tool 14 respectively. The Y axis resolvers 29a–d and the Z axis resolvers 31a–d are geared similarly to the X axis resolvers 27a–d.

The three sets of resolvers shown are electrically energized by two sinusoidal A.C. voltages separated 90° in phase. In each resolver, these voltages are applied to a pair of input windings which are physically separated by 90°. They will be assumed to be the stator windings with the output signals appearing on the rotor windings. The energizing voltages are chosen to have a frequency of 500 cycles per second and are derived from a 500 kiloherz clock 33 whose output is divided by 1000 by a reference counter 35. The output of the reference counter 35 is a 500 cycle per second square wave which is then converted into a sine wave of the same frequency by a sine wave shaper 37. The output of the since wave shaper 37 is further converted by a 90° phase shifter into a second sinusoidal voltage whose phase lags the output of the sine wave shaper 37 by 90°. Through a pair of bus lines 41 and 43 the outputs of the since wave shaper 37 and of the wave shifter 39, respectively referred to as the reference voltage and the quadrature voltage, are applied to the input windings of all of the resolvers.

In accordance with the well-known principle of operation of resolvers energized by a pair of voltages spaced 90° apart, each resolver produces at its output winding a voltage whose frequency is equal to that of the energizing voltages applied to its input windings and whose phase relative to that of the energizing voltages is a function of the output windings' position relative to the input windings. In a typical resolver of the type contemplated, each degree of rotation of the rotor of a resolver, and of the rotor winding mounted on the rotor, causes the phase of the output voltage to vary by one electrical degree relative to the phase of the reference energizing voltage; thus a 360° rotation of a resolver rotor will cause the phase of the output voltage to shift 360° relative to the phase of the reference input voltage.

The phases of the output voltages of the respective resolvers in any particular one of the three sets of resolvers 27, 29, and 31 are illustrated in FIG. 5. It is there seen that, because of the gear reductions interposed between successive resolver rotors, the output phase of the coarse resolver 27d changes 360° for each hundred inches of movement of the movable element. This follows, since the rotor of the coarse resolver 27d rotates through 360° for every hundred inches of movement of the tool 14. Following the same reasoning it is seen that the medium coarse, medium fine, and fine resolvers produce output voltages whose phases relative to the phase of the reference voltage go through a 360° change with each ten inches, one inch, and .1 inch of movement of the tool 14 respectively.

The foregoing explanation of the outputs of the resolvers, which was directed to the resolver set 27 also applies to the resolver sets 29 and 31 since they are physically arranged and electrically energized in the same manner. Thus, each of the three sets of resolvers 27, 29, and 31 is operative to produce a series of recurring signals, with successive signals in each series representing position along a particular axis but within successively smaller ranges, wherein each succeeding range includes an integral number of the next smaller ranges.

In accordance with a feature of the invention, means are provided for converting the phase variable outputs of the of the respective sets of resolvers into digitally signaled numbers, such means including a Digital Sweep Generator combined with a series of time-shared devices designed to catch a particular count state of the digital sweep as a function of the phase angles of the respective resolver outputs.

The Digital Sweep Generator is shown as part of the same block earlier referred to as the REFERENCE counter 35 and is operative to produce a digital sweep formed of signals digitally representing a reference number which during successive time intervals repeatedly and cyclically changes from a first to a second predetermined value by uniform increments at uniformly time-spaced instants. In the exemplary embodiment shown in FIG. 2, the outputs of the digital sweep 35 signaled on its output lines 45, 47, and 49 represent a number which changes from 000 through 999 once every 2 milliseconds, or one count every 2 microseconds. As will be explained in detail later, each of the three output lines 45, 47, and 49 actually represents a group of four lines, successive groups of lines carrying in binary form the hundreds, tens, and units digits of the reference number signaled. It will be noted that the frequency of recurrence of the reference and quadrature voltages used to energize the resolvers is the same as that of the reference number forming the digital sweep, 500 c.p.s in the illustrated embodiment. The phase angle of the reference signal relative to the time intervals of the digital sweep is maintained constant, and will here be assumed to be 0° so that during each time period during which the reference number is swept through its range, the phase of the reference signal used to energize the resolvers goes from 0° through 359° to 0° again. Similarly, it will be assumed that all of the resolvers are so oriented in their mountings that the phase angles of their output voltages relative to that of the reference energizing volage are at 0° when the tool or workpiece whose position they indicate is situated on the borderline separating adjacent ranges covered by the resolvers.

To derive from the Digital Sweep Generator 35 digital numbers which are representative of the phase angles of the output voltages produced by the resolvers, there are provided a series of "Digital Catchers," one for each group of resolvers having the same gear ratio relative to the lead screws 20, 22, and 24. Thus a Fine Digital Catcher 51a is provided for the fine resolvers 27a, 29a, and 31a Similarly, medium fine, medium coarse, and coarse Digital Catchers 51b–d are provided for the medium fine, medium coarse, and coarse resolvers 27b–31b, 27c–31c, and 27d 31d respectively.

Each of the four Digital Catchers 51a–d has a set of storage registers respectively numbered 53a–d. Inputs of the respective storage registers are connected through sets of WRITE gates 55a–d to selected ones of the output lines 45, 47, and 49 of the Digital Sweep Generator 35. In particular, the medium fine, medium coarse, and coarse Digital Catchers 51b–d each have a two digit storage register capable of storing, in sections labeled A and B respectively, two binary coded decimal digits of successively higher digital significance, or eight binary signals in all. The Fine Digital Catcher 51a is shown as having a larger capacity storage register capable of storing three binary coded decimal digits of successively higher significance in three sections labeled A, B, and C respectively, or twelve binary signals in all. The latter feature of providing storage for an extra digit in the Fine Digital Catcher 51a is optional and is merely to provide a higher resolution for the digitized value of the fine resolvers than is provided for the coarser resolvers.

The WRITE gates 51b–d of the medium fine, medium coarse, and coarse Digital Catchers 51b–d each include means for admitting eight individual binary signals into their associated registers at a selected time when they are enabled to do so, i.e., when they are opened. These three sets of WRITE gates are connected to the hundreds and tens group of lines 45 and 47 of the digital sweep and consequently are operative to enter into their associated storage registers 53b–d any one of one hundred digitally signaled numbers through which the digital sweep cycles on the two groups of output lines 45 and 47. The WRITE gate 55a of the Fine Digital Catcher 51a, on the other hand, has means for entering twelve individual binary signals into its associated storage register 53a and is connected to all three groups of output lines 45, 47, and 49 of the Digital Sweep Generator 35. Consequently, it is capable of entering any one of 1000 count states which appear on the three lines 45–49 during each sweep of the Digital Sweep Generator 35, thus providing a digital sweep of higher resolution for the Fine Digital Catcher 51a by virtue of the ten count states signaled on the lines 49 between each pair of count states signaled on the lines 45 and 47.

To capture from the sweep generator 35 digitally signaled numbers representative of the phases of the various resolver output signals, each of the Digital Catchers 51a–d includes means for enabling the WRITE gates of the respective catchers in response to the output signals of selected resolvers reaching a predetermined phase angle with respect to the cycling intervals of the digital sweep. Again using the Fine Digital Catcher 51a as an example, the output signals produced by the three fine resolvers 27a, 29a, and 31a associated respectively with the X, Y, and Z axes are individually fed through lines 28a, 30a, and 32a to three squarer circuits 57a, 59a, and 61a respectively. Each of the squarer circuits is operative to produce an indication when the recurring signal which it receives from its associated resolver reaches a predetermined angle. In the exemplary system which will be described, the squarer circuits simply convert the sinusoidal outputs of the respective resolvers into square waves, thus producing a logic "1" voltage level beginning with the instant when the signal which they receive goes through zero in a positive direction. The output of the squarer circuit 57a is gated at an appropriate time through a time control AND gate 63a and, at subsequent selected times, the outputs of the squares 59a and 61a are similarly gated through time control AND gates 65a and 67a. Through a common OR gate 69a, the gated outputs of the three squarers 57a, 59a, and 61a are applied through a reclocking circuit 71a to the gating input of the WRITE gates 55a. The function of the reclocking circuit will be explained in connection with a more detailed description of the Digital Catchers and it is not necessary to understand their function at this point for an understanding of the operation of the over-all system.

In accordance with another important feature of the invention, the same Digital Catcher is used to derive a digitally signaled number from the digital sweep 35 for all three of the X, Y, and Z axis resolvers 27a, 29a, and 31a. To this end, the time-shared control AND gates 63a, 65a, and 67a are enabled during different, regularly recurring time intervals of the digital sweep produced by the sweep generator 35. A typical time-sharing sequence is shown in FIG. 6 to which more detailed reference will be made later. It may be observed at this point, however, that the ten columns of FIG. 6 represent ten complete and successive sweeps of the Digital Sweep Generator 35. It will be noted that during each sweep, represented by one of the columns of FIG. 6, the reference number which is digitally signaled by the sweep generator 35 on lines 45 and 47 cycles through a hundred successively increasing values. FIG. 6 also shows the time periods devoted to digitizing the outputs of X axis, Y axis, and Z axis resolvers 27a, 29a, and 31a respectively. For reasons which will become apparent as this description proceeds, there is devoted to the digitizing of the output signals of each of the three resolvers a time period which includes a complete cycle of the digital sweep and a portion of the following cycle.

To control the digitizing periods for the three resolvers, there is provided a digitize control block 75 which produces and applies through lines 76, 77, and 78 to the AND gates 63a, 65a, and 67a respectively, timing signals timed to provide access from the squarers 57a, 59a, and 61a to the WRITE gates 55a during the three time periods during which digitizing of their associated resolvers is to be performed. The timing of the digitize control block 75 is derived through a Program Step Generator 79 from the Digital Sweep Generator 35 so that the periods during which digitizing of the outputs of the several resolvers takes place is conveniently synchronized with the periods of the digital sweep.

Looking briefly to the operation of the system as thus far described, during the first digitizing period in which the output produced by the X axis fine resolver 27a is applied after squaring and reclocking to the control input of the WRITE gates 55a, there will be deposited in the storage registers 53a a digitally signaled number captured from the Digital Sweep Generator 35 at an instant which occurs shortly after the output signal of the resolver goes through zero in a positive direction. With the fine resolver 27a properly oriented, when the tool 14 is at the point dividing adjacent ranges represented by the resolver, the phase angle of the output signal produced by the resolver goes from 0° to 360° during the same time period in which the count state of the digital sweep goes from 000 through 999. As the tool 14 is translated along the range within which its position is represented by the phase of the fine resolver output signal, the instant at which that signal crosses zero in a positive direction, relative to the instant when the cycle of the digital sweep commences progressively changes, and with it changes the count state of the Digital Sweep Generator 35 captured in the storage register of the Digital Catcher 51a. In particular, in the case of the fine resolvers 27a, 29a, and 31a, the digitally signaled number captured in the storage register 53a will change by one for each .36 degree of angle through which they turn, or for each .0001 inch of travel along their respective axes.

The Digital Catchers 51b, c, and d associated with the medium fine, medium coarse, and coarse resolvers 27, 29, and 31 include the same arrangement for opening their respective WRITE gates 55b, c, d, as that described for the fine Digital Catcher 51a. Components of these Digital Catchers are labeled with the same reference numerals as the components of the fine Digital Catcher 51a to which they correspond but with the suffixes b, c, and d attached to indicate the respective Digital Catchers 51b, c, and d to which they belong. Connections of these Digital Catchers to the rest of the system are in the same manner as those for the fine Digital Catcher 51a. Thus outputs of the medium fine resolvers 27b, 29b, and 31b are individually applied through lines 28b, 30b, and 32b to squarers 57b, 59b, and 61b of the Medium Fine Digital Catcher 51b, outputs of the medium coarse resolvers 27c, 29c, and 31c are applied through lines 28c, 30c, and 32c to the squarers 57c, 59c, and 61c of the Medium Coarse Digital Catcher 51c and the outputs of the coarse resolvers 27d, 29d, and 31d are individually applied through lines 28d, 30d, and 32d to the squarers 57d, 59d, and 61d of the Coarse Digital Catcher 51d respectively.

Similarly, the output lines of the digitize control 75, which have been shown as connected to the time-share control AND gates 63a, 65a, and 67a of the Fine Digital Catcher 51a, are also connected to the corresponding AND gates of the other three Digital Catchers 51b–d. Thus, the digitize control output line 76 is also connected to digitize control AND gates 63b–d, output line 77 is also connected to AND gates 65b–d and output line 78 is also connected to AND gates 67b–d.

Following the same reasoning applied to explaining the digitizing of the fine resolvers 27a, 29a, and 31a, it will be seen that following each digitizing period shown in FIG. 6 there will be captured in the storage registers of the four digitizers 51a–d four multi-digit digitally signaled numbers respectively representing the phase angles of the output signals produced by the fine, medium fine, medium coarse, and coarse resolvers. It will be understood that, whereas the number captured in the storage registers 53a of the Fine Digital Catcher 51a was shown as a three digit number, the numbers captured in the storage registers of the other three Digital Catchers will consist of only two digits for the embodiment illustrated in FIG 2.

In accordance with yet another feature of the invention, means are provided for combining the multi-digit numbers representing signals produced by the respective sets of resolvers into single composite numbers, with each composite number being an indication of the combined outputs of all resolvers associated with a given axis. Thus, during the first digitizing period, devoted to converting the signals produced by the X axis resolvers, there will have been captured in the four storage registers 53a–d four digitally signaled multi-digit numbers. Following this digitizing period, the multi-digit numbers are transferred to a compositor 83 wherein the individual numbers are combined into a single composite number. To this end, each Digital Catcher includes a set of READ gates 85, respective ones of the Digital Catchers 51a–d having therein READ gates 85a–d respectively. Timing signals are supplied from a Read Control Network 87 to respective ones of the READ gates 85a–d through timing control lines 89a–d respectively. The Read Control Network 87 is suitably driven by signals from the Program Step Generator 79 in a manner similar to that in which the Program Step Generator drives the Digitize Control Network 75.

In response to a gating signal received on the line 89a, the contents of the A stage of the storage register 53a appear on output lines 91 of the READ gates 85a and the outputs of the B and C stages of the same register appear on output lines 93 and 95 of the READ gates. It will be recalled that each of the stages of storage register 53a include means for individually storing four binary signals. Thus it will be understood that the group of READ gates 85a will contain twelve individual gates and that each of the three output lines 91, 93, and 95 actually represent a trunk of four individual lines, each line associated with one of the gates in the group. The trunk lines 91, 93, and 95 are connected to individual inputs of the compositor 83 and thus serve to carry signals from respective ones of the stages A, B, and C of the storage register 83a. The line 91 is also connected to the outputs of READ gates 85b–d and in particular to those ones of the READ gates which carry signals from the A stages of the registers 53b–d. Similarly, the output lines 93 are connected to the outputs of those ones of the READ gates 85b–d which carry signals from the B stages of the storage registers 53b–d.

The timing signals which are applied over the lines 89a–d to the READ gates 85a–d occur in sequence after each digitizing period. Accordingly, the contents of the storage registers 53a–d are sequentially transmitted over all or some of the lines 91–95 to the compositor 83 after each digitizing period. The manner in which signals transmitted after a given digitizing period are combined into a composite number will be described subsequently in detail.

Figure 3:
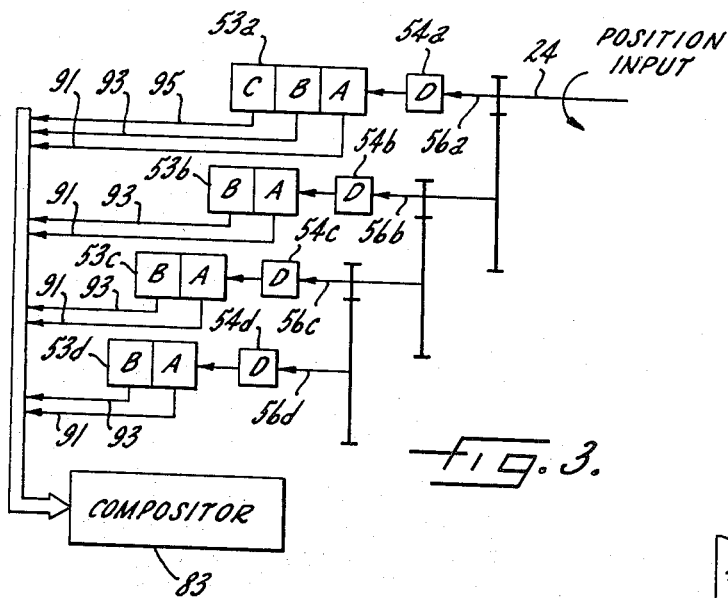
FIG. 3 is a simplified block diagram of the system shown in FIG. 2 designed to show the relative digital significance of numbers stored in different storage registers of the system of FIG. 2.
Figure 3A:
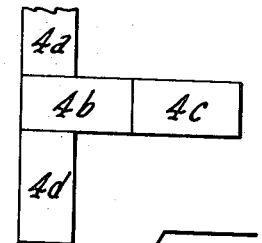

For an understanding of the relative digital significance of the numbers captured in the respective storage registers 53a–d during each of the three digitizing periods, reference should be made to FIG. 3 which shows a greatly simplified diagram of the four storage registers and of the signal generating equipment associated with a single axis of the movable element 11. Assuming that the simplified diagram represents equipment associated with the X axis, there are shown four registers 53a–d which are those shown in FIG. 2. The simplified system of FIG. 3 is shown as having as its input the X axis leadscrew and the remainder of the signal generating and digitizing equipment for producing the fine, medium fine, medium coarse, and coarse signals is represented by four blocks bearing the character D and numbered 54a–d respectively, and by a set of four shafts 56a–d successively geared down to move at successively smaller rates relative to that of the leadscrew 20. Finally, for simplicity, the READ gates associated with the successive registers 53a–d are not shown separately so that the output lines 91, 93, and 95 are shown directly connected through a common trunk 97 to the compositor 83.

It is an important aspect of the system incorporating the invention that the digitally signaled numbers which are captured in respective ones of the registers 53a–d include digits of corresponding digital significance. In particular, for numbers stored in successive ones of the registers 53b–d, the lowest order digit corresponds in significance with the highest order digit of the number stored in the preceding register.

Thus, with reference to FIG. 5, the number which will be captured by the storage register 53a associated with the Fine Digital Catcher 51a goes through a complete cycle from 000 through 999 and back to 0 for each complete revolution of its associated resolver 27a or for each .1 inch of lateral movement of the movable element 11. Consequently, the number captured by stage C of the storage register changes by 1 for each .01 inch of movement along the X axis and the number captured by stage B of the register changes by 1 for each .001 inch of such movement.

Now looking at the number captured in storage register 53b associated with the Medium Fine Digital Catcher 51b and again referring to FIG. 5, it is seen that the number captured by it will go through a complete cycle from 00 through 99 and back to 0 for each whole inch of movement along the X axis so that the number stored in stage B of the register 53b will cycle through ten counts as the tool 14 is translated through a distance of an inch and correspondingly the number stored in stage A of the register will change by a count of 1 for each .01 inch of movement of the tool. Thus the digital significance of stage A of register 53b is seen to be the same as that of stage C of register 53a. Following the same reasoning, it is seen that the lowest order digit of the number stored in register 53c has the same digital significance as the highest order digit stored in register 53b and that the same relationship exists between the numbers stored in registers 53d and 53c. To help visualize this relationship, the respective registers 53a–d are so arranged in FIG. 3 that stages which contain digits of corresponding, i.e. same, significance are in vertical alignment.

To recapitulate, there has thus far been described a system for digitally signaling position along a plurality of axes and including a Digital Sweep Generator 35 and several sets of resolvers 27, 29, and 31 which are energized synchronously with the digital sweep and which produce for each axis a series of signals which by their phase angles represent position within successively larger ranges along the particular axis with which they are associated. During successive digitizing periods, the outputs of successive ones of the resolver sets are used to cause each of a series of Digital Catchers, one for each resolver, to catch from the Digital Sweep Generator 35 a digitally signalled multi-digit number which is representative of the phase angle of its associated resolver output. Furthermore, because of the successive gearing down of the series of resolvers in a given set, the digitally signaled numbers captured in the successive Digital Catchers associated with those resolvers each represent the position of the movable element within a range of a different size, successive ranges including an integral number of ranges of the next smaller size so that the lowest order digit of a given number corresponds in digital significance to the highest order digit of the preceding number. Thus, by means of the Digital Catchers a series of multi-digit numbers, one number for each resolver of a given set of resolvers, is captured during each digitizing period so that, during a complete cycle of the system, there will have been captured in the Digital Catchers one complete series of digital numbers for each set of resolvers or for each axis of movement to be represented.

After each digitizing period, the numbers captured in the respective Digital Catchers are transferred, in order of numbers of increasing digital significance, to a compositor unit 83 wherein the individual numbers are combined into a single composite number representative of the position of the movable element along the axis. While the manner in which the individual numbers are combined into a single composite number forms an important part of the present invention, explanation of this feature will be given in a later section devoted to a detailed explanation of an exemplary compositor.

THE DIGITAL POSITION SIGNALING SYSTEM IN DETAIL

(1) The Central Timing System

In carrying out the invention, provision is made for producing a digital sweep formed of signals which digitally represent a reference number repeatedly and cyclically changing from a first to a second predetermined value during successive time intervals. Provision is also made for timing a reference voltage and a quadrature voltage, used for powering synchronous induction devices such as resolvers, to occur at the same frequency of recurrence as that of the digital sweep. Finally, means are provided for producing signals which control the time periods during which output signals produced by various sets of resolvers are converted into digital numbers. A particularly compact unit which has been used for performing all of these functions is the Central Timing System 101 shown in FIG. 46.

(a) Producing the digital sweep

Forming part of the Central Timing System is a series of four cascaded binary coded decimal pulse counters 103, 105, 107, and 109. The digital sweep is derived from the outputs of the first three stages 103, 105, and 107 respectively labeled the A, B, and C decade counters and collectively identified as the Digital Sweep Generator 102.

The decade counters 103–109 are of similar construction and are well known to those skilled in the art. A typical unit of this type includes four cascaded flip flops interconnected so that the decade repeatedly counts from 0 to 9 in response to successive input pulses, being reset to 0 by every tenth input pulse and signaling its contents on four output lines, or terminals, in 8, 4, 2, 1 binary code. Additionally, each time the unit is reset to 0, it produces a signal trailing edge on a fifth or "carry" line.

The A decade counter 103 is stepped by output pulses produced at a repetition frequency of 500 kilohertz by a Divide by 4 circuit 111 which in turn is driven by pulses from a 2 megahertz clock 113. The output pulses produced by the clock 113 and by the Divide by 4 circuit 111 are shown in FIG. 7 as the wave forms 115 and 117 respectively. The units digit of the digital sweep is signaled on output terminals of the A decade counter 103, labeled A1, A2, A4, and A8 to signify the binary weight of the signals appearing on the respective terminals. Since the pulse repetition frequency of the pulses applied to the A decade counter 103 is 500 kilohertz or a pulse every 2 microseconds, the A decade counter cycles through its ten count stages every 20 microseconds. Through line 119, the "carry" output of the A decade counter 103 is applied to the input of the B decode counter 105 and consequently that counter cycles through its ten count states every 200 microseconds and on its four output terminals, labeled B1, B2, B4, and B8 is signaled the tens digit of the digital sweep. The carry output of the B decade counter 105 is applied to the input of the C decade counter 107 through line 121, causing that counter to cycle through its ten count states every 2 milliseconds. It is on the output terminals C1, C2, C4, and C8 of this counter that the binary coded decimal signals representing the hundreds digit of the digital sweep are derived.

Collectively, the decade counter 103, 105, and 107 produce a digital sweep formed of signals representing a reference number which repeatedly cycles during successive time intervals from a first predetermined value (here 000) to a second predetermined value (here 999) by uniform increments (here 1) and at uniformly time-spaced instants (here 2 microseconds). The signals produced by the Digital Sweep Generator 102 are applied to several parts of the system and in order to maintain clarity in the drawings, these connections are not indicated by lines. Instead the output terminals of the Digital Sweep Generator 102 contain the symbol Δ and terminals of devices elsewhere in the system which are connected to terminals of the Digital Sweep Generator contain similar symbols with an additional indication of the particular Digital Sweep Generator terminal to which they are connected.

(b) Producing gating pulses to assure utilization of the digital sweep while its count states are stable The progression of the reference number collectively signaled by the decade counters of the Digital Sweep Generator 102 is shown in FIG. 7 as the staircase shaped wave form 123. It will be seen that each new count state begins with the negative going edge of the wave form 117 and lasts until the next such negative going edge. The wavy line during the initial portion of each count state represents an instability period during which the counters are tumbling from their previous count states. It is the principal function of the Divide by 4 circuit 111 to produce a gating pulse which occurs during the central portion of the stable period of each count state so that units in the system which utilize the output of the Digital Sweep Generator may be gated open to receive the outputs of the Digital Sweep Generator during its stable count states.

The Divide by 4 circuit 111 includes two gated flip flops 125 and 127. The flip flop 125 has a pair of inputs J1 and K1 for receiving gating signals and a third input labeled CP for receiving clock pulses. The flip flop also has a pair of outputs labeled T1 and $\overline{T1}$ characterized by the fact that when a logic "1" level signal appears at one of the outputs a logic "0" level signal is produced at the other. The flip flop 127 has inputs and outputs corresponding to those of flip flop 125 and are labeled J2, K2, CP, T2, and $\overline{T2}$. Flip Flops of the type illustrated for use in the Divide by 4 circuit are commonly referred to as J–K flip flops and are well known to those skilled in the art. It will therefore suffice here to describe the manner in which they operate and this is concisely shown in FIG. 8. The figure appearing in the columns headed J and K represent the logic level of the gating signals being applied to the J and K inputs of a given flip flop. $Q_n$ indicates that the flip flop is in its initial state, that is, the state in which it was before application of a clock pulse at its CP input. The symbol $\overline{Q}_n$ indicates that the flip flop has changed state from its initial state.

With reference to FIG. 8 it is seen from the first row of the table that, if neither the J input nor the K input receives a logic 1 level signal, i.e., if neither J nor the K input is "qualified," while the clock pulse is applied to the flip flop, then the clock pulse does not change the state of the flip flop.

From the second row of the table it is seen that, with only the K input qualified during application of a clock pulse, the first clock pulse following qualification of the K input of the flip flop will reset it to its "0" state, in which state its T output produces a logic 0 level and its $\overline{T}$ output produces a logic 1 level.

From the third row of the table it apperas, with only the J input qualified, application of a clock pulse will set the flip flop to its "1" state, that is, to that state in which its T output produces a logic 1 signal and its $\overline{T}$ output produces a logic 0 signal. With respect to the last two situations it will be understood that, if the flip flop is already in the 0 state when its K input is qualified, it will simply stay in that state after a clock pulse is applied to it. Similarly, if the flip flop is already in the 1 state when its J input is qualified, it will simply stay in that state after receiving a clock pulse.

The final set of conditions is shown in the fourth row of the table of FIG. 8 wherein both the J and K inputs of the flip flop are qualified at the time when a clock pulse is applied to the flip flop, and it is seen that in this situation, application of a clock pulse to the flip flop will cause it to reverse its state from whichever state it had been in prior to application of the clock pulse.

With this basic understanding of the J–K ip flops which form the Divide by 4 circuit 111, operation of the circuit can be simply described. It is the well-known switch tail or Johnson counter and is basically a two-stage serial shift register connected in a loop with the outputs cross-connected to the inputs. The T1 and $\overline{T1}$ inputs of flip flop 125 are connected to the J2 and K2 inputs of flip flop 127 respectively and the T2 and $\overline{T2}$ outputs of flip flop 127 are connected to the K1 and J1 inputs respectively of the flip flop 125. The clock pulse inputs of both flip flops 125 and 127 receives pulses from the 2 megahertz clock 113. Assuming that initially both flip flops are in the reset condition, logic 1 signals are applied by the $\overline{T1}$ and $\overline{T2}$ outputs of the flip flops to the K2 and J1 inputs of the two flip flops. This is indicated by the wave form diagrams shown to the right of the Divide by 4 circuit 111. Consequently, upon receiving the negative going or switching edge of the first clock pulse, the first flip flop 125 becomes set but the second flip flop 127 remains in the reset condition.

With the flip flop 125 set, when the negative-going edge of the second clock pulse occurs, the T1 output of flip flop 125 will be qualifying the J2 input of flip flop 127 while the $\overline{T2}$ output of flip flop 127 will continue to qualify the J1 input of flip flop 125 so that the negative-going edge of the second clock pulse will leave the flip flop 125 in the set state but will also cause the second flip flop 127 to switch from the reset to the set state.

Thus, when the third clock pulse arrives, the T1 and T2 outputs of flip flops 125 and 127 will qualify the J2 and K1 inputs of flip flops 125 and 127. Since the K1 input of flip flop 125 and the J2 input flip flop 127 are qualified when the trailing edge of the third clock occurs, that trailing edge will cause flip flop 125 to be reset while leaving flip flop 127 in the second condition. This last change causes the $\overline{T1}$ output of flip flop 125 to qualify the K2 input of flip flop 127 and the T2 output of flip flop 127 to qualify the K1 input of flip flop 125. With this set of conditions existing, arrival of the trailing edge of the fourth clock pulse leaves the flip flop 125 in the reset condition but causes flip flop 127 to be reset from its previously set condition. This is the condition in which we originally found the two flip flops and from this point on, the cycle repeats.

The T2 pulse train, produced by the flip flop 127, is the one used to drive the Digital Sweep Generator 102, which is advanced by one count with each negative going edge of the T2 waveform. Thus, the time which elapsed during the four clock pulses represents one count state of the Digital Sweep Generator 102. Specifically, the A decade counter 103 changes its count state on the trailing edge of the T2 pulse, delayed by the propagation delay of its flip flops. Decade counter 105 changes its count state, as signaled at its output terminals, on the trailing edge of the carry output of decade counter 103, delayed by the delays of the flip flops in counter 105. Thus the delays in successive counters 103–109 cumulate. The shaded area spanning the second, third, and fourth T2 clock pulses begins at the instant when the C decade counter 107 has stabilized and ends when the A decade counter 103 begins to change. Thus the shaded area represents the approximate time period during which all of the counters 103–107 of the Digital Sweep Generator 102 are in a stable state. The unshaded area, coinciding approximately with the first clock pulse T2 represents the brief time period during which some of the individual counters of the Digital Sweep Generator are tumbling to their new count states.

To produce a gating pulse which falls approximately during the mid-portion of the shaded area representing the stable state of the Digital Sweep Generator, the T1 output of flip flop 125 and the T2 output of flip flop 127 are applied to an AND gate 129. From the wave forms related to the Divide by 4 circuit 111, it is seen that the T1 and T2 outputs of flip flops 125 and 127 are concurrently at a logic 1 level during the mid-portion of the shaded area so that during this time period a logic 1 or enabling voltage level appears at the output of AND gate 129. This signal is represented by the logical symbol T1·T2.

(c) Generating the program steps

The Central Timing System 101 also includes means for producing timing signals during different predetermined states of the Digital Sweep Generator so as to time the operation of various elements in relation to particular count states of the Digital Sweep Generator 102. The particular arrangement used here comprises a Program Step Generator 79 formed of the B and C decade counters 105 and 107 of the Digital Sweep Generator 102, and the D decade counter 109, the latter being driven by the carry output of the C decade counter 107. Just as the ABC decade counters 103, 105, and 107, when taken together, comprise a Divide by 1000 counter which cycles through a thousand different count states 500 times per second, so the BCD decade counters 105, 107, and 109, when taken together, comprise a Divide by 1000 counter which cycles through a thousand different count states 50 times per second. Stated differently, the count signaled by the ABC decade couners 103, 105, and 107, which comprise the Digital Sweep Generator 102, changes ten times for every change in the count signaled by the BCD decade counters 105, 107, and 109 which comprise the Program Step Generator 79.

The relationship just described is graphically illustrated in FIG. 7 wherein the waveform 135 illustrates the steps through which the Program Step Generator 79, formed of the BCD decade counters 105, 107, and 109, progresses. Each of these steps is a program step, and it is seen from the figure that, during the same period in which the program steps progress from 0 to 100, the Digital Sweep Generator goes through a complete cycle from 000 to 999.

The relationship between digital sweep numbers and program steps is also illustrated in FIG. 6. It shows a rectangular chart vertically divided into ten columns, each column divided into ten equal zones and each zone being further divided into ten equal steps. Thus the chart is divided into one thousand equal steps, and each step represents one count state of the Program Step Generator 79. The top step in the first column is labeled 000 and represents the initial count state of the Program Step Generator 79. The bottom or last step of the first column is labeled 99 and represents the 100th count state of the Program Step Generator. Steps in the remaining nine columns have a similar significance; thus, the top step of the second column represents count state number 101, the bottom step of that column the 200th count state, and so on through the entire chart until the last step of the last column, representing the 1000th count state of the Program Step Generator.

As pointed out earlier, for each step or count state of the Program Step Generator 79 the Digital Sweep Generator 102 goes through ten steps or count states of its own. Thus, during each 100 steps represented by succesive columns of the programming chart, the Digital Sweep Generator cycles through a thousand different count states from 000 through 999 and this is indicated by the left-ward sloping line 123 which is an approximate representation of the count states of the Digital Sweep Generator 102.

Continuing with the consideration of the Program Step Generator 79, it is seen that it generates a series of 1000 potential program steps from which any step may be selected by means which are responsive to the particular set of signals existing on the outputs of the Program Step Generator during that step. This selection might be performed by devoting a separate set of AND gates to each program step that is to be selected. Obviously this would require quite a large number of such AND gates since each program step is signaled on twelve output terminals, B1–B8, C1–C8, and D1–D8. Consequently, to reduce the complexity of the equipment required to select various program steps for performance of differently timed functions, a series of three binary coded decimal to decimal code converters 141, 143, and 145 are provided for reducing the number of signals by which different program steps are represented. Each of the three code converters has four input terminals for receiving a binary coded decimal digit from one of the three decade counters of the Program Step Generator 79 and ten output terminals. The units converter 141 signals the units digit of the program step on one of ten terminals label 0 through 9; the tens converter 143 signals the tens digit of the program step on one of ten terminals labeled 00 through 90; and the hundreds converter 145 signals the hundreds digit of the program step on one of its ten outputs labeled 000 through 900.

Through the use of the code converters, each of the 1000 program steps shown in the programming chart in FIG. 6 is represented by signals on a different combination of three output terminals among the thirty output terminals of the code converters 141, 143, and 145. As an example, assume that the Program Step Generator is in its count state number 746, or with reference to the programing chart of FIG. 6, in the 47th step of the eighth column. This count state and program step will be represented at the output terminals of the Program Step Generator 79 by logic 1 signals appearing on terminals B2 and B4, C4, and D1, D2, and D4. In contrast this same count state and program step is represented at the outputs of the binary coded decimal to decimal converters 141, 143, and 145 by logic 1 signals on three output terminals: the 700 terminal of the hundreds converter 145, the 40 terminal of the tens converter 143, and the 6 terminal of the units converter 141. Thus, if it were desired to initiate operation of some part of the system during program step 746, it could be accomplished by use of means such as an AND gate responsive to concurrent signals on the three code converter output terminals just listed.

It may also be noted, that, for timing certain functions in the system during a given program step, the input signal which steps the B decade counter 105 is utilized. This signal marks the beginning of each program step, and is brought out at terminal 148 labeled PCP (for Program Clock Pulse).

(d) Synchronizing the resolvers

A third function performed by the Central Timing System is to provide synchronization for the means which produce the voltages used to drive the various position indicating synchronization devices used in the system. As stated in the description of the over-all system, the phase angle of the reference wave used to drive the synchronous devices relative to the cycling periods of the digital sweep which is produced by the Digital Sweep Generator 102 is optional so long as the phase angle remains constant. For purposes of this explanation, it is assumed that the reference voltage powering the synchronous devices is exactly in phase with the cycling periods of the digital sweep. By means of a flip flop 147, a square wave which is in phase with the cycling periods of the digital sweep is generated. The flip flop 147 may be of the same type as those described in connection with the Divide by 4 circuit 111 and it is so shown. To drive the flip flop 147 in phase with the digital sweep, its J input is connected to the C4 output of the C decade counter 107 and the "ANDed" C1 and C8 ouputs of the same decade counter are applied by means of an AND gate 149 to the K input of the flip flop. Finally, the clock pulse (CP) input of the flip flop is connected to the carry output line 121 of the B decade counter 105. Consequently, in accordance with the operation of the J-K flip flop as explained with reference to FIG. 8, the flip flop 147 is set every time the Digital Sweep Generator 102 changes from its 499th count state to its 500th count state and is reset every time the Digital Sweep Generator changes from its 999th count state to its 000 state. The desired square wave voltage appears at the Q output of the flip flop 147 and is shown in FIG. 6 as the wave form 150 to the immediate right of the programming chart.

(2) Producing the Position Indicative Phase Variable Analog Signals

To provide an indication of the actual position of the workpiece 13 and milling tool 14 along the respective axes and within various ranges along those axes, means are provided for producing a recurring signal which indicates position along a particular axis and within a particular range along that axis by its phase angle relative to the cycling intervals of the digital sweep. Synchronous induction devices having two relatively movable parts are particularly suitable for this purpose. In the illustrative embodiment shown herein, such synchronous induction devices are shown for generating all of the phase variable position indicative signals and, as stated previously in the description of the over-all system, these devices are in particular shown as resolvers, there being two sets of four resolvers for representing the position of the milling tool 14 along each of two axes, and a third set of four resolvers for signalling the position of the workpiece 13 along a third axis or twelve resolvers in all. One of these, the X axis fine resolver 27a is shown in FIG. 4c and includes a stator with stator windings 151 and 153 associated with a rotor carrying a rotor winding 155. As stated earlier, the resolver rotor is mechanically coupled through suitable gearing to the lead screw 20 so that, for each 0.1 inch of travel by the milling tool 14 traversed by the saddle 16 along the X axis, the resolver rotor turns through 360°.

To excite the resolver, the 500 cycle per second square wave output 150 of the flip flop 147 is converted into a pair of 500 cycle per second sinusoidal voltages 90° out of phase with one another. The first stator 151 is energized by a reference voltage which is in phase with the square wave output of the flip flop 147 and appears in FIG. 6 to the right of the square wave as wave form 157. It is derived from the square wave 147 by means of a sine wave shaper earlier referred to as the block 37 in FIG. 2a. Such devices are well known to those skilled in the wave shaping art and will not be described here.

The second stator winding 153 is energized by a sine wave which lags by 90° behind the reference voltage wave 157 and is derived therefrom by a 90° phase shifter again previously shown in FIG. 2a as the block 39 and having an input connected to the output of the sine wave shaper 37. The phase shifter 39 is of a type, well known to those skilled in the art, which produces a sine wave which is of constant amplitude and whose phase is exactly 90° lagging relative to the sinusoidal signal applied to its input.

(3) Capturing Number Signalled by the Digital Sweep Generator (The Digital Catchers)

(a) In general

In converting phase variable position indicative signals into digital numbers in accordance with the invention, means are provided for "capturing" or storing the signals appearing at the outputs of the Digital Sweep Generator at an instant when the phase varible signals reach a predetermined absolute phase, i.e., reach a predetermined point along any given cycle thereof, e.g., a zero crossing point. In the exemplary embodiment, signals representing the instantaneous count state of the Digital Sweep Generator are captured in a series of Digital Catchers 51a–d, each Digital Catcher receiving signals representing the instantaneous position within a particular range along different axes. These Digital Catchers were described briefly with reference to FIG. 2b. They are shown in greater detail in FIGS. 4b and 4d.

Referring to FIG. 4b, the components previously described with reference to FIG. 2b will be recognized. Through a common set of WRITE gates 55a a three stage register 53a receives the signals appearing on the output terminals A1–A8, B1–B8, and C1–C8 of the Digital Sweep Generator 102. In its A stage, the register 53a stores the units digit of the reference number forming the digital sweep; in its B stage the register stores the tens digit of the digital sweep; in its C stage the register stores the hundreds digit of the digital sweep. A set of READ gates 85a are provided for applying the signals stored in the register 53a to three trunk lines 91, 93, and 95, each having four individual conductors and respectively carrying the contents of the A, B, and C stages of the register 53a.

To provide an indication of the instant when the phase variable, position indicative signals reach a predetermined point along their respective cycles, here the instant when they cross zero voltage in a positive going direction, a series of squarer circuits 57a, 59a, and 61a are provided for the X axis, Y axis, and Z axis signals respectively. These squarer circuits are shown in FIG. 2 as connected through lines 28a, 30a, and 32a to the fine resolvers 27a, 29a, and 31a respectively. In the more detailed illustration of FIG. 4b, only one of these resolvers 27a is shown and it will be understood that the Y axis squarer 59a and the Z axis squarer 61a are connected to resolvers in the manner shown in FIGS. 2a–2b. The outputs of the X, Y, and Z axis squarer circuits 57a, 59a, and 61a are gated through time share control AND gates 63a, 65a, and 67a respectively and through an OR gate 69a collectively to the input 159 of the Fine Reclocking Circuit 71a. Each of the three time-share control AND gates 63a, 65a, and 67a has a control input terminal which when energized with a logic 1 signal opens the gate and causes the signal appearing at the output of its associated squarer circuit to be applied through the OR gate 69a to the input of the Fine Reclocking Circuit 71a.

Figure 4A:
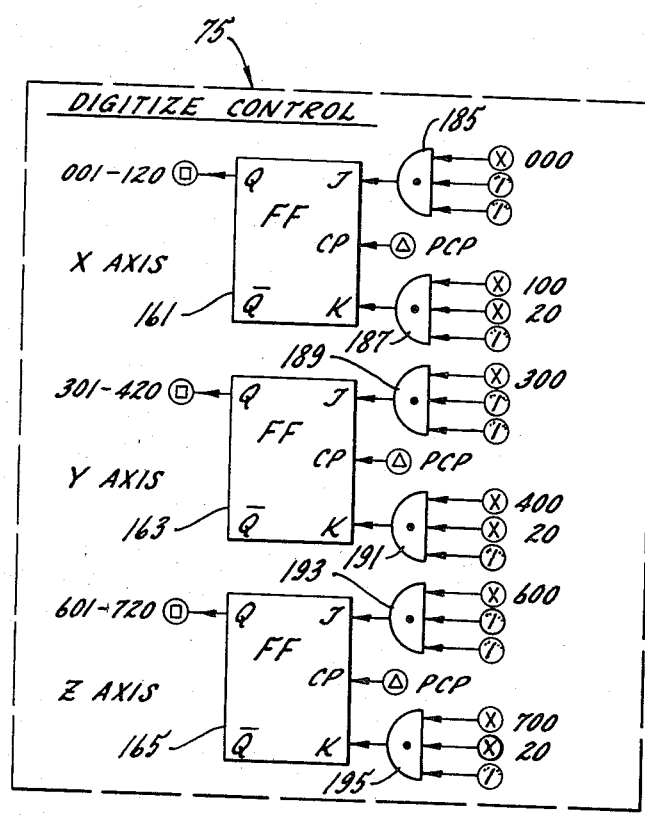
FIG. 4, formed of FIGS. 4a–4d when joined as indicated in FIG. 3a, is a detailed block diagram of a system embodying features of the present invention.

Timing signals suitable for opening the respective time-share control AND gates 63a, 65a, and 67a for appropriate time periods is conveniently derived by means of three digitize control flip flops 161, 163 and 165 shown in FIG. 4a as forming the digitize control block 75. The Q output terminals of all three of the flip flops 161, 163, and 165 are labeled with the symbol ▢ which corresponds to similar symbols appearing in the control terminals of the time-share control AND gates 63a, 65a, and 67a.

The output terminals of the digitize control flip flops 161–165 and the control input terminals of the time-share control AND gates 63a–67a also bear reference numerals and it will be understood that each flip flop output terminal bearing a given reference numeral is connected to the time-share control AND gate input terminal which bears the same reference numeral. Thus it is seen from inspection of FIGS. 4a and 4b that the output terminals of the time-share control flip flops 161, 163, and 165, respectively labeled 001–120, 301–420, and 601–720, are connected to the identically labeled control input terminals of the time-share control AND gates 63a, 65a, and 67a respectively.

Let it be assumed that initially the flip flop 161 is set, applying a logic 1 signal through its Q output terminal to the time-share control AND gate 63a so that the output of the X axis squarer 57a is applied to the input of the Fine Reclocking Circuit 71a. Let it be assumed further that the position of the milling tool 14 along the X axis is such that the sine wave output of the resolver 27a, applied to the X axis squarer 57a and shown in FIG. 7 as the wave form 167, crosses 0 in a positive direction during the twelfth count state of the digital sweep generator, shown in FIG. 7 as the step 012 of the step ladder wave form 123. The instant at which the output signal produced by any of the resolvers goes through 0 is a randomly occurring one, that is, it may occur at any time, its time of occurrence being a function only of the relative angular positions of the rotor and stator windings of the resolver involved. Thus, the zero crossing may occur during the time period in which the Digital Sweep Generator is in its stable count state or it may occur while the generator is in its unstable state during which it is tumbling to assume a new count state.

The X axis squarer 57a produces a logic "1" level voltage shown in FIG. 7. as wave form 169 at the instant of this positive-going zero crossing. If the output of the squarer circuit were applied directly to the WRITE gates 15a, then every time the positive-going zero crossing of the sine wave occurred during the unstable period of the Digital Sweep Generator a spurious set of signals would be deposited in the register 53a. It is to assure that this does not occur that the Fine Reclocking Circuit 71a is provided. By means of this circuit, the output of the squarer 57a gated through the AND gate 63a and the OR gate 69a is delayed, or retimed, to occur during the following stable count state of the Digital Sweep Generator.

(b) The fine reclocking circuit

The Fine Reclocking Circuit 71a includes a pair of flip flops 169 and 171 of the same type used in the Divide by 4 circuit 111. Thus the first flip flop 169 has a pair of inputs labeled J1 and K1 and a pair of outputs labeled Q1 and $\overline{Q1}$, while the second flip flop 171 has a pair of inputs labeled J2 and K2 and a pair of outputs labeled Q2 and $\overline{Q2}$. In addition each of the two flip flops has a clock pulse input labeled CP and both of the flip flops receive at their CP inputs the T2 output of the Divide by 4 circuit 111 through line 173. The two flip flops 169 and 171 are cascade connected, with the Q1 and $\overline{Q1}$ outputs of flip flop 169 being applied to the J2 and K2 inputs of flip flop 171 respectively.

Qualifying signals for the J1 and K1 inputs of the first flip flop 169 are derived from the input signal which is applied to the input terminal 159 of the reclocking circuit 71a. The input signal is directly applied to the J1 input of the flip flop 169 and is inverted by means of an inverter 175 and then applied to the K1 input of the same flip flop.

So long as the squarer circuit 57a produces a logic 0 signal, that is, up to the instant when the sinusoidal voltage 167 applied to the squarer circuit 57a crosses zero in a positive direction, both of the flip flops 169 and 171 will remain in the reset condition. This follows, since a logic 1 voltage level will continue to be applied to the K1 input of flip flop 169 by the inverter 175 so that the first clock pulse received by the flip flop will reset it and all subsequent clock pulses will continue to leave it in the reset condition. With the flip flop 169 reset, a logic 1 voltage level is applied by its $\overline{Q1}$ output terminal to the K2 input of flip flop 171. Consequently if that flip flop is not already in the reset condition, it will be reset by the clock pulse following that which caused flip flop 169 to be reset and will remain in the reset condition from then on, so that, up to the instant when the output of the resolver 27a crosses zero in a positive direction, the voltage level appearing at the Q1 output of flip flop 169 shown in FIG. 7 as wave form 177, remains at the logic 0 level, and the voltage at the $\overline{Q2}$ output of flip flop 171, shown in FIG. 7 as the wave form 179, remains at the logic 1 level.

These conditions continue until the output of resolver 27a crosses zero in a positive direction. When this occurs, the output of the squarer circuit 57a goes to a logic 1 level and this signal is applied through the time-sharing AND gate 63a and the OR gate 69a to the J1 input of flip flop 169. Consequently, upon occurrence of the next clock pulse following the positive-going zero crossing of the resolver's output signal, the flip flop 169 becomes set and its Q1 output goes to a logic 1 level. This is seen to occur in FIG. 7 with the trailing edge of the thirteenth clock pulse T2, which is the wave form 117 and which is the pulse applied to the clock pulse input of the flip flop 169. Although the Q1 output of the flip flop 169 is caused to go to the logic 1 level, this does not occur in time to cause the flip flop 171 to be set by the same clock pulse which had caused flip flop 169 to be set. Flip flop 171 remains reset until the trailing edge of the next T2 pulse is applied to its clock pulse input, which in FIG. 7 is shown as the fourteenth T2 pulse. It is this pulse which sets the flip flop 171, causing its $\overline{Q2}$ output to go to logic 0 level.

It will be noted that the trailing edge of the thirteenth T2 pulse represents the end of the thirteenth count state of the Digital Sweep Generator 102, labeled 012 on the step ladder wave form 123 and that the trailing edge of the fourteenth clock pulse T2 represents the end of the fourteenth count state of the sweep generator labeled 013 on the same wave form. Thus, in response to receiving a logic 1 voltage level commencing during the count state 012 of the Sweep Generator 102, the flip flops 169 and 171 produce a pair of wave forms 177 and 179 which are concurrently at the logic 1 voltage level during the count state 013, that is, the count state following that during which the input to the reclocking circuit went from logic 0 to logic 1 level.

To produce a signal which indicates the time period during which the wave forms 177 and 179 are at logic 1 level, an AND gate 181 is provided, with one of its inputs connected to the Q1 output of flip flop 169 and with its other input connected to the $\overline{Q2}$ output of flip flop 171 so that the output of the AND gate, shown in FIG. 7 as the wave form 182, is at the logic 1 level during the time period in which the Q1 and $\overline{Q2}$ outputs of flip flops 169 and 171 are at the logic 1 level, that is, during the count state following that in which the signal received by the reclocking circuit goes to the logic 1 level. Finally, to define a time period within that defined by the signal 182 produced by AND gate 181 during which the Digital Sweep Generator 102 is in its stable count state, a second AND gate 183 is provided, with one of its inputs receiving the output of AND gate 181 and with its second input receiving the $T1 \cdot T2$ signal produced by the AND gate 129 of the Divide by 4 circuit 111. This signal was discussed previously in connection with the Divide by 4 circuit 111 and is shown as the wave form 133 which has a logic 1 voltage level safely within the time period during which the digital sweep is in a stabilized count state.

Thus, in response to a logic 1 level input from the squarer 57a, the Fine Reclocking Circuit 71a produces at its output, formed by the output of the AND gate 183, a logic 1 voltage level signal identified in FIG. 7 as the wave form 184 which coincides in time with the $T1 \cdot T2$ signal produced by the Divide by 4 circuit within the first stable count period of the Digital Sweep Generator following the count period during which the squarer signal is received.

From the foregoing, it is seen that, regardless of when the output of the X axis fine resolver 27a crosses zero in a positive direction the WRITE gates 55a to which the output of the Fine Reclocking Circuit is applied will be opened during the first stabilized count state following that during which the zero crossing occurred. The Fine Digital Catcher is therefore operative to capture in its storage register 53a a digitally signaled number from the Digital Sweep Generator 102 which is representative of the phase of the phase variable position representative signal produced by the X axis fine resolver 27a relative to the cycling intervals of the digital sweep.

The foregoing detailed description of the Fine Digital Catcher applies equally to the other three Digital Catchers 51b–d used in the system except for the fact that, as pointed out earlier, the Digital Catchers 51b–d capture a two digit number from the Digital Sweep Generator in contrast to the Digital Catcher 51a which stores a three digit number. Thus, during the same digitizing period in which the time share control AND gate 63a of the Fine Digital Catcher 51a is opened by the X axis digital control flip flop 161, the AND gates 63b–d of the Digital Catchers 51b–d are also opened by that flip flop. Therefore, during the X axis digitizing period the Medium Fine Digital Catcher 51b receives signals which appear at the outputs of the Digital Sweep Generator 102 at the instant when the output of the Medium Fine Resolver 27b crosses zero in a positive direction, the Medium Coarse Digital Catcher receives a similar set of signals from the Digital Sweep Generator 102 when the output produced by the medium coarse resolver 27b crosses zero in a positive direction, and similarly the Coarse Digital Catcher 51d receives its set of digitally signaled numbers from the Digital Sweep Generator 102 when the output signal produced by the coarse resolver 27d crosses zero in a positive direction.

(c) Time sharing the digital catchers

In accordance with an important feature of the invention, the same means which were used to derive digitally signaled numbers indicative of the phase variable signals representing position along the X axis are also employed to derive numbers representing phase variable signals indicative of position along the Y and Z axes. In the particular embodiment described, the four Digital Catchers 51a–d are used during successive regularly recurring time periods to derive digitally signaled numbers from the Digital Sweep Generator 102 which represent the phase angles of the signals produced by the Y axis resolvers 29a–d and the Z axis resolvers 31a–d.

The time periods during which the outputs of the X axis squarers 57a–d, the Y axis squarers 59a–d, and the Z axis squarers 61a–d are applied to their respective reclocking circuits 71a–d; i.e., the time periods during which the X, Y, and Z axes are digitized, are shown in the programing chart appearing in FIG. 6. The X axis resolvers are digitized during time periods which extend from program step 001, near the top of the first column, down to program step 120, a short distance below the top of the second column in the program chart. Digitizing of the Y axis resolvers begins during program step 301 and ends during program step 420. Finally, the Z axis resolvers are digitized during time periods which begin during program step 601 and end during program step 720. The reason for the particular length of each digitizing period will be explained shortly in connection with yet another feature of the invention.

When it is recalled that the program steps of the programing chart are reiterated once every twenty milliseconds or fifty times a second, it is seen that the resolvers representing position along each of the three axes are digitized during recurring time periods and, that the time periods during which respective ones of the three sets of resolvers are digitized succeed one another, so that, in all, the respective sets of resolvers representing position along the X, Y, and Z axes are digitized during successive, periodically recurring, mutually interspersed time periods.

As explained previously, the time period during which the outputs of the X axis squarers 57a–d are applied to their respective reclocking circuits 71a–d are controlled by opening the time-share control AND gates 63a–d for the desired time period. The control inputs of the AND gates 63a–d are connected to the Q output of the X axis digitize control flip flop 161 in FIG. 4a. Therefore, to cause the outputs of the X axis squarers 57a–d to be applied to the reclocking circuits 71a–d for the desired time periods, the flip flop 161 is set during program step 000 and is reset during program step 120. This is achieved simply by a pair of program gates 185 and 187 whose outputs are connected to the J and K inputs of the flip flop 161 respectively. Clocking pulses for switching the flip flops 161, 163, and 165 are derived from the PCP output terminal 148 of the Program Step Generator, and are applied to the CP inputs of the respective flip flops.

Each of the program gates 185 and 187 is an AND gate having three inputs. Some of the inputs of the AND gates are marked with an "X" and with a number to the right of the input. These are connected to similarly labeled output terminals of the units, tens, and hundreds binary coded decimal to decimal converters 141, 143, and 145 of the Central Timing System. Others of the input terminals of the AND gates 185 and 187 are labeled with a "1" and these are connected to a source of logic 1 voltage level. Thus, two of the inputs to the program gate 185 are connected to a logic 1 voltage level and are always enabled. The third input to the AND gate is connected to the 000 output of the hundreds BCD to D converter 145. Consequently, the program gate 185 produces a logic 1 signal which qualifies the J input of the flip flop 161 during the program step 000 and the flip flop is set by the next PCP pulse representing the commencement of the second program step 001. Similarly, the program gate 187 has one input connected to the one hundred output terminal of the BCD to D converter 145 and a second input connected to the 20 output of the tens BCD to D converter 143 while its third input terminal is connected to a source of logic 1 voltage level. Consequently a qualifying signal is applied by the program gate 187 to the K input of flip flop 161 with the occurrence of the PCP pulse marking the commencement of the 121st program step 120.

Without going into similar detail with reference to the means for digitizing the X and Y axes, it will be noted that the time-share control AND gates 65a–d, which control digitizing of the Y axis resolvers, have their control inputs connected to the Y axis digitize control flip flop 163 and that the third series of time-share control AND gates 67a–d, which control digitizing of the Z axis resolvers, have their control inputs connected to the Q output of the Z axis digitize control flip-flop 165. Both of the latter flip flops are clocked by the same PCP program clock pulse used to clock the X axis flip flop 161, the trailing edge of each such clock pulse occurring at the beginning of a program step. A pair of program gates 189 and 191 are connected to the J and K inputs of the Y axis flip flop 163 and another pair of program gates 193 and 195 is connected to the J and K inputs of the Z axis flip flop 165. Each of the latter four program gates has three inputs as did the first two program gates 185 and 187. By inspection of the signals which are applied to the program gates 189–195, it is seen that the flip flop 163 is set at the beginning of the program step 301 and is reset at the end of program step 420 and that the flip flop 165 is set at the commencement of program step 601 and is reset at the end of program step 720.

(d) Extending The Digitizing Time Periods To Allow For High Resolver Speeds

The length of the digitizing time periods for the respective axes is chosen so that regardless of when the signals produced by the resolvers associated with the respective axes go through zero in a positive direction, that positive-going zero crossing will occur during the digitizing period for that axis. Stated differently, it is desirable that for each of the periods in the recurring series of time periods devoted to digitizing a particular axis, there should be produced a digital representation of position of the element along the axis involved. Using as an example the X axis fine resolver 27a, if this resolver moved at a very slow speed, its output frequency would remain substantially at 500 cycles per second, or one positive-going zero crossing every two milliseconds. Since the Digital Sweep Generator 102 cycles through a complete sequence every two milliseconds, it would be assured that, if the cycling period of the Digital Sweep Generator were chosen as the digitizing period, the positive-going zero crossing of the resolver output would always occur during that digitizing period, so that during each digitizing period a number representative of the phase angle of the resolver output would be produced. However, at high speeds of rotation, the output frequency of a rotary inductive device such as a resolver varies from the frequency of the voltages with which it is energized. This will be understood when it is realized that the two voltages used to energize the resolver input windings create a magnetic field which rotates at the frequency of the energizing voltages or, in the present case, a rate of 500 revolutions per second. Thus, depending upon whether the rotor winding of the resolver is made to rotate in the same direction as the rotating magnetic field or in an opposite direction, the frequency of the output voltage induced in the rotating winding will diminish or increase by an amount which is determined by the speed of rotation of the resolver rotor. For example, if the saddle 16 is moved along the X axis at a speed of 4 inches per second in a first direction, the X axis fine resolver 27a will rotate at 40 revolutions per second in the same direction as the direction of rotation of the magnetic field produced by the current in the stator winding, so that the frequency of the output signal will be 460 cycles per second. If now the saddle is caused to move along the X axis in the opposite direction at the same speed, then the output signal produced by the X axis fine resolver 27a will be 540 cycles per second. These speeds may be encounter in actual practice. Assuming that the time devoted for digitizing the X axis included only a single sweep of the Digital Sweep Generator 102, an increase in the frequency of the signal produced by the X axis fine resolver 27a would not create a problem. It would merely cause two zero crossings to occur during a single digitizing period, but the first zero crossing would have no effect except to cause a first number to be written-into the storage registers 53a; the second zero crossing will cause a second writing of a slightly different number. If, on the other hand, the output signal frequency of the resolver 27a were reduced sufficiently so that the time period between successive positive-going zero crossings of the output signals became significantly longer than the time period during which a complete digital sweep is produced, then the danger of missing such a positive-going zero crossing would be substantial.

It is a feature of the present invention that a digital representation is given of each phase variable signal during each of a series of regularly recurring digitizing time periods even when high machine speed causes the frequency of the phase variable signal to diminish to a substantial extent. It is in carrying out this feature of the invention that each digitizing period is extended to include, in addition to a complete cycle of the digital sweep generator, the initial part of the following cycle as well. In the exemplary embodiment, each digitizing time period includes a complete digital sweep and the initial fifth of the following digital sweep, this representing a safety factor sufficient to assure reliable operation up to a twenty percent increase in the period of the phase variable output signal that is to be digitized.

Since successive resolvers are geared down to rotate at successively lower rates relative to the rate of rotation of the fine resolver in each of the three axes, the amount of additional digitizing time required for the medium fine, medium coarse, and coarse resolvers are successively less than that required for the fine resolver in each of the three axes. Thus when the fine resolver in a given set of resolvers rotates at 40 r.p.s., the medium fine resolver rotates at only 4 r.p.s. and the medium coarse and coarse resolvers revolve at rates of .4 and .04 r.p.s. respectively. In the exemplary system, for sake of simplicity, the same amount of time is devoted to digitizing the outputs of all resolvers, irrespective of their relative rates of rotation. It should be understood, however, that this is a matter of convenience only and that, if it become necessary, considerably less time could be devoted to digitizing the medium coarse and coarse revolvers in each set than is necessary for digitizing the fine and medium fine resolvers.

(4) Combining Numbers Stored in the Several Digital Catchers (The Compositor Unit)

(a) The method

By means of the apparatus thus far described there is deposited in a series of storage registers a series of multi-digit numbers during successive regularly recurring periods of a digital sweep, successive series of these numbers digitally representing the outputs of successive series of devices producing phase variable signals for indicating positions along different axes and within different ranges along each of the axes, the highest order digit of a given order number corresponding to the lowest order digit of the next higher order number in each series of numbers. Thus, a first series of multi-digit numbers are deposited in the Digital Catchers 51a–d during the period devoted to digitizing the X axis resolvers 27a–d. The lowest order digit of the number stored in the Medium Fine Digital Catcher corresponds in digital significance to the highest order digit of the number stored in the Fine Digital Catcher 51a; the lowest order digit of the number stored in the Medium Coarse Digital Catcher corresponds in digital significance to the highest order digit stored in the Medium Fine Digital Catcher 51b; and the lowest order digit stored in the Coarse Digital Catcher 51d has the same digital significance as the highest order digit stored in the Medium Coarse Digital Catcher 51c.

During the next time period in the cycle of the system, devoted to digitizing the Y axis resolvers 29a–d, a second series of numbers is deposited in the Digital Catchers 51a–d having the same relation to one another as numbers store during the previous digitizing period and digitally representing the phase variable outputs of the respective Y axis resolvers 29a–d. Finally, during the third digitizing period of the system cycle extending from program step 601 to program step 720, the phase variable outputs in the Z axis resolvers 31a–d are digitized into a series of multidigit numbers stored in the Digital Catchers 51a–d, numbers in the respective Digital Catchers having the same digital significance relative to one another as did the numbers stored therein during the previous two digitizing periods.

In accordance with a feature of the invention, there is provided a method, and a means for carrying out that method, whereby after each digitizing period the numbers stored in the respective digital catching devices 51a–d are successively read from them and corrected where necessary by comparing the highest order digit of the lowest order number with the lowest order digit of the next higher order number and altering the value of the next higher order number until its lowest order digit conforms with the highest order digit of the lowest order number, and then using the highest order digit of the corrected number to similarly provide a basis for correcting the next higher order number which in the illustrative embodiment would be the number taken from the Medium Coarse Digital Catcher 51c. Furthermore, following each comparison of digits of corresponding significance, a determination is made of the nature or sense of the difference between the digits of corresponding significance, and, in particular, the lowest order digit of the higher order number is subtracted from the digit of corresponding significance of the lower order number. If the remainder is greater than a predetermined integer, the value of the higher order number is altered in an opposite sense to the sign of the remainder, whereas, if the remainder is not greater than the predetermined integer, the value of the higher order number is altered in the same sense as the remainder's sign. Finally, after all of the numbers of a given series have been corrected to conform with the next lower order number in the series, they are combined to form a composite number which has the accuracy of the lowest order number of the series but when the range which is equal to that provided by the highest order number of the series.

The above method and the apparatus for carrying it out will be described in detail with reference to combining numbers stored in the Digital Catchers 51a–d during a particular series of digitizing time periods associated with a single given axis, the X axis.

Before explaining the apparatus whereby numbers are first corrected and then combined, a concrete numerical example will be given to explain why it is necessary that such a correction be made and then the method whereby the correction is made as well as the apparatus for making it will be explained using the same numbers employed in the example.

Let it be assumed that the actual position of the milling tool 14 traversed by saddle 16 along the X axis is 90.9090 inches to the right of a datum position located in space to the left of the farthest point to which the milling tool 14 can be traversed. With reference to FIG. 5a, a typical set of numbers which might be deposited in the fine, medium fine, medium coarse and coarse digitizers in response to signals produced by the X axis resolvers 27a–d might be 090, 88, 10, and 89. These numbers appear in FIG. 5a with digits of corresponding digital significance being in vertical alignment in a manner similar to that employed in FIG. 3. In fact, the digits 090 are stored in the C, B, and A stages of the Digital Catcher 51a, the digits 88 are stored in the B and A stages of the Digital Catcher 51b, the digits 10 are stored in the B and A stages of the Digital Catcher 51c, and the digits 89 are stored in stages B and A of the Digital Catcher 51d. Thus the relative significances of the digits shown in FIG. 5a may be confirmed with reference to FIG. 3.

FIG. 5a also shows the relative digital significance of each of the digits stored in the various registers. Thus, the relative digital significance of the most significant digit of the lowest order number stored in the Fine Digital Catcher 51a is three, as is that of the lowest order digit of the next higher order number stored in the Medium Fine Digital Catcher 51b. Similarly, on the same scale, the highest order digit of the number stored in the Medium Fine Digital Catcher 51b as well as the lowest order digit of the next higher order number stored in the Medium Coarse Digital Catcher 51c have a relative digital significance of four. Finally, the highest order digit of the number in the Medium Coarse Digital Catcher 51c and the lowest order digit of the highest order number stored in the Coarse Digital Catcher 51d both have a relative digital significance of five.

A comparison of digits of corresponding, or overlapping, significance in the different numbers shown to be stored in the different Digital Catchers 51a–d shows that at times they will differ. Why this should be so will now be explained with reference to FIG. 5 where the digitized outputs of the resolvers are graphically shown with reference to the different ranges within which those resolvers indicate movement.

In FIG. 5 horizontally extending arrows along different ones of four ranges indicate the position of the milling tool 14 within those ranges as indicated by the respective numbers stored in the Digital Catchers 51a–d associated with the respective ranges. The numbers appear as numerals to the right of these arrows and in parentheses are shown the numbers which should have been stored in the respective registers. Beginning with the Coarse Digital Catcher 51d, the number stored in it is 89, indicating that the element lies just short of the 90 inch mark along the 100 inch Coarse range. Since the true position of the element is 90.9090 inches, the number stored in the Coarse Digital Catcher 51d should have been 90.

Looking next at the 10 inch range within which movement of the tool 14 is indicated by the number deposited in the Medium Coarse Digital Catcher 51c, it is seen that this number is 10, indicating that the tool 14 is on the line separating the first and second one inch sub-sections within one of the ten inch long medium coarse ranges covered by the medium coarse resolver 27c. Again, since the true position of the milling tool 14 is 90.9090, it is seen that the number stored in the Medium Fine Digital Catcher should have been 09.

Stored in the Medium Fine Digital Catcher 51b is the number 88, representing the position of the tool 14 within one of the one inch ranges along the X axis path of the tool. The particular one inch long medium fine range within which the tool 14 is actually situated is shown in FIG. 5 as the "blown-up" first inch of the final ten inch long medium coarse range within which it was seen that the element is in fact located. As indicated by the arrow below the blown-up medium fine range and by the number to the right of that arrow, the number stored in the Medium Fine Digital Catcher 51b is 88. However, since the true position of the element is 90.9090, it is known that, instead of 88, the number stored in the Medium Fine Digital Catcher 51b should have been 90.

Finally, there is shown in FIG. 5 one of the fine ranges within which movement of the tool 14 along the X axis is represented by the fine resolver 27a. The particular fine range which is shown in expanded form is the last .1 inch sub-section of the one inch medium fine range within which the tool 14 is known to be located. As indicated by the short arrow below this illustrated fine range and by the number to the right of that arrow, the number which is stored in the fine Digital Catcher 51a is 090. This agrees with the true position of the tool 14 which is 90.9090.

The foregoing example illustrates that, except for the Fine Digital Catcher 51a, all of the other Digital Catchers 51b–d contain numbers which are slightly in error. The magnitudes of the errors are slight and may be caused either by misalignment of the resolvers in their mountings or by slight variations in the phases or amplitudes of the voltages used to energize the various resolvers.

In accordance with an important feature of the present invention, the number which is stored in the Fine Digital Catcher 51a is compared with the number stored in the Medium Fine Digital Catcher 51b, and the latter is modified to conform with the former if there is an excessive discrepancy. Similarly, the number stored in the Medium Fine Digital Catcher 51b as conformed is compared with a number stored in the Medium Coarse Digital Catcher 51c and again the latter is changed to conform with the former in the event of an excessive discrepancy. Next, the conformed number representing position along a medium coarse range is compared with the number which is representative of position along the coarse range and if the difference is excessive the latter is conformed to the former until they agree. Finally, the corrected numbers are combined to form a single composite number which indicates the true absolute position of the element, in this instance the milling tool 14 along the X axis.

More particularly, keeping mind that the highest order digit of each number representing position along a particular range corresponds in significance to the lowest order digit of the number representing position along the next larger range, a first comparison is made between corresponding digits of the two lowest order numbers representing position within the two smallest ranges, by subtracting the lowest order digit of the higher order number from the highest order digit of the next lower order number. A remainder is formed. If the remainder exceeds a predetermined integer, then the number representing position within the larger range is altered in a sense which is opposite to the sign of the remainder until the digits of correpsonding order agree. On the other hand, if the remainder does not exceed the predetermined integer, then the number representing position within the larger range is altered in the same sense as the sign of the remainder until corresponding order digits of the two numbers are equal. This process is continued with the corrected number representing position within the second range being compared with the number representing position within the next higher range, and with a correction being made in the third number in accordance with the same rules just stated in connection with the comparison of the first and second numbers. This process of successive correction of numbers in order of numbers representing position within ranges of progressively larger size is continued until the number representing position in the largest size range has been conformed. Once this has been done, the numbers as corrected are combined into a single composite number representing position within all of the ranges.

In practice it has been found that, when the successively larger ranges each include ten of the next smaller size ranges, and when the numbers stored in representation of position within these ranges are decimal numbers (albeit in binary code) the foregoing process yields excellent results when the predetermined integer is 4.

It has also been found, however, that the method will also work satisfactorily if the predetermined integer is 4 for a negative remainder, and 5 for a positive remainder. Indeed, the method will work well with several pairs of dissimilar predetermined integers.

A better insight into the values which may be selected for the predetermined integer (or integers) is provided by the following analysis in which FINE refers to a multi-digit number representing position within a given range along a line, and in which COARSE refers to a second multi-digit number representing position within the next larger range along the line. Thus, in terms of the terminology employed in the specific embodiment herein described FINE may be taken as the number stored in the Fine Digital Catcher 51a and COARSE may be taken as the number stored in the Medium Fine Digital Catcher 51b.

The optimum way to correct for number misalignment between the FINE and the COARSE is to recognize that there is one initial state of alignment of numbers that would be considered as perfect. If the COARSE were then to slip relative to the FINE by 10 least significant digits of the COARSE, it would be back in perfect numerical alignment again. Consequently, it may be said that there is a condition of perfect numerical alignment of the overlapping digits, and that it recurs for every 10 counts of relative slippage (change in alignment) of the COARSE number relative to the FINE. But that means that there are 9 states of relative misalignment where the overlapping digits will not be the same, and that something must be done to the COARSE to make it conform.

First, assume that the ideal alignment is such that the overlapping digits are equal. Certainly this is the obvious best relation (but not the only possible relation that could be defined as the "ideal"). If perfect alignment of overlapping digits exists, then the difference is $F-C=0$ for all possible cases.

If some misalignment develops between the COARSE and the FINE as a result of gearing errors, backlash, etc., the COARSE may lag a little at times and lead a little at other times. Assume next that a correction is to be made for 5 steps of relative misalignment where the COARSE number lags behind the FINE number, and for 4 steps of misalignment where the COARSE number leads the FINE number (this would yield corrections for all leads and lags which are less than these limits.)

Consider what happens when the COARSE lags the FINE by 5 steps. The $F-C$ differences would be $-5$ at times and $+5$ at other times, depending upon the particular numbers. Because the COARSE lags the FINE by 5 steps, the COARSE number has to be advanced (increased) by $+5$ in all cases. So the test would be for $>-4$, i.e., the predetermined integer would be $-4$. The $+5$ differences would be used unchanged; but the tens complement with opposite sign would be used to correct for the $-5$ differences. This then gives a $+5$ as the standard correction to use when the COARSE lags the FINE by 5 steps, for all numbers.

Consider next, what happens when the COARSE leads the FINE by 4 steps. The $F-C$ differences would be $-4$ and $+6$. Now the COARSE should be retarded (which means reduce the number) to get it to agree with the FINE. This means that a $-4$ correction to the COARSE is required in all cases. So the $-4$ differences are applied unchanged to modify the COARSE, but the tens complement with reverse sign of $+6$, $(-4)$, would be used for the other. The test would be for $>+5$, i.e., the predetermined integer would be $+5$. It is to be understood that the symbol $>$ is used in the sense that $+5>4$, and $-4>-3$.

Whether it is better to allow for as much as 5 steps of lag and 4 steps of lead of the COARSE relative to the FINE, or whether some other choice would be better is a matter of design judgment.

If it is decided that a correction is to be made for 4 steps of lag and 5 steps of lead (and anything of lesser misalignment as well), the test values would be $>-5$, $>+4$.

If the decision is to correct for 4 steps of lead, 4 steps of lag, and anything of lesser misalignment as well, then the test values would be $>-4$, $>+4$. These are the particular test values, or predetermined integers, used in the specific embodiment shown in FIG. 4.

If correction is to be made only for 3 steps of lag and 3 steps of lead, and any thing of lesser misalignment, then the test values would be $>-6$, $>+6$.

If allowance is to be made for 2 steps of lag and 7 steps of lead, and anything of lesser misalignment, (there are nine possible conditions of misalignment of numbers, all being corrected. The tenth condition is back in alignmet again, and it must be assumed to be correct).

Two steps of lag requires a +2 correction to the COARSE; consequently, the tens complement with reverse sign of —8 would be used. There would be the cases of one step of lag corresponding to a —9, so the negative test would be >—7.

Seven steps of lead (also 6, 5, 4, 3, 2, 1) correlate to the differences that might be —7, —6, —5, —4, —3, —2, —1 which would be used just as they are; and differences that are +3, +4, +5, +6, +7, +8, +9; which would be complemented and then changed in sign. So the positive test would be >+2.

The above series of examples satisfy the following rules:

Rule 1: If a misalignment of X steps of lead is to be corrected, the test to apply is $>+(9-x)$. (This assumes that the COARSE leads the FINE; that is, the COARSE is too large, and must be reduced.)

Rule 2: If a misalignment of Y steps of lag is to be corrected, the test to apply is $>-(9-y)$.

$X+Y$ should not exceed a total of 9 steps. If $X+Y=6$, then there are 3 conditions of number misalignment that are not being corrected. However, these conditions occur only when the amount of misalignment is abnormally great.

Next, consider the possibility that involves an initial intentional misalignment of 5 steps of COARSE lagging the FINE. This means that even under ideal conditions a $F-C$ value of +5 would be expected which, when added to the COARSE would bring it up to the proper value. In this case, limits should be set to correct for $X=0$ steps of lead, to $Y=9$ steps of lag. This means that the mechanical inaccuracies could pull the COARSE ahead of its normal 5 step lag to where there is no lag, and the system would work; also that the mechanical inaccuracies could retard the COARSE still further behind its normal 5 step lag to where there are 9 steps of lag and the system would still work. The test values to apply would be: $>+9, >-0$.

The normal 5 step lag would given differences of +5 and —5. The +5 differences would remain unchanged, i.e., the COARSE number would be changed by the amount of the difference. The —5 differences would become +5. This is the standard correction to apply to the COARSE when it is 5 steps lagging the FINE. When the COARSE has pulled 4 steps ahead of the normal 5 step lag, there is only 1 step of lag remaining. $F-C$ differences would be +1 and —9. The —9 would become a +1. Therefore, +1 is the standard correction to apply to the COARSE when it is lagging by one step.

If the COARSE pulls even with the FINE, lag equals 0. There is no need for any correction, and applying the last test, none would be made.

Assume finally that the COARSE lags the full 9 steps behind the FINE. The differences would be +9 and —1, depending on the numbers. The —1 differences would be converted to +9. Therefore, +9 is the standard correaction to apply to the COARSE when it is 9 steps lagging the FINE.

(b) The apparatus—a detailed description

In accordance with the invention, means are provided for combining in the manner described in the foregoing section the numbers accumulated in the digital catching means 51a–d during each digitizing period, this combining taking place following each such digitizing period. By these means the first series of numbers captured in the digital collecting means 51a–d are temporarily stored.

Processing of numbers stored in the Digital Catchers 51a–d during the program steps 001–120 is carried out during the program steps 121–142 immediately following this period. Similarly, processing of numbers stored during the periods assigned to digitize the Y axis and Z axis position signals is performed during program steps 421–442 and 721–742 immediately following those digitizing time periods, seen in FIG. 6. To perform the computational steps required, a compositor unit 83 is provided as illustrate in FIG. 4c. The compositor unit 83 will be explained with reference to its operation in performing the necessary computational steps to combine numbers which are stored in the Digital Catchers 51a–d.

The compositor 83 includes a seven decade adder 201 (FIG. 4c) suitable for adding or subtracting successive multi-digit decimal numbers signaled in binary code. As shown for decade number 7, each decade of the adder 201 includes four stages for performing addition or subtractor on the four binary signals representing the decimal digit received by the particular decade.

Each of the four stages of every decade of the adder 201 has an addend input, an augend input, a sum output and a carry output, the last being applied to a carry input of the next higher order stage. Thus, for example, decade No. 7 of the adder has four addend inputs labeled 91–8, 91–4, 91–2, and 91–1 for receiving the digitally signaled number which appears on the lines 91 leading to the compositor 83 from the read gates of the A register stages of the Digital Catchers 51a–d. Corresponding augend inputs of the seventh decade of the adder 201 are numbered 203–8, 203–4, 203–2, and 203–1 respectively.

Each of the decades of the Adder 201 also includes gating means (not shown) for controlling entry of signals into the adder. By appropriate timing signals (produced by means not shown here) the input gates of the adder are enabled to cause the signals to be entered into the adder at a particular instant of time, this instant marking the beginning of the adder cycle which lasts until the occurrence of the next adder timing signal at which time the next group of signals are entered into the added. For reasons which need not be elaborated upon here, digital adders of the type here illustrated have cycles which are synchronous with the program steps during which digitally signaled information appears on their input lines but are staggered with respect to those program steps. In the present case, it may be assumed that each adder cycle begins exactly when one half of a program step has elapsed.

A second principal component of the compositor 83 is the register 205 having a first series of decades labeled 1 through 7 and corresponding to decades 1 through 7 of the adder 201, and a second series of stages labeled 8 through 11. As shown for decade 7 of the register 205, each decade includes four storage devices, typically flip flops, for storing the four binary signals by which a decimal digit is represented. Each of the decades 1 through 7 of the register 205 also has a set of WRITE gates for controlling entry of information into the respective decades of the register. In all, each decade of the register 205 has four gated inputs through which a binary coded digit may be entered into the decade and four outputs on which the number stored in the decade is signaled.

Through their respective WRITE gates, decades 1 through 7 of the register 205 receive the outputs of correspondingly labeled decades of the adder 201. In turn, the outputs of each of the decades 1 through 7 of the register 205 are connected to the augend inputs of a corresponding decade of the adder 201 through a set of CAR (Clear Adder Register) gates 207–1 through 207–7. During normal operations, the CAR gates associated with corresponding decades of the adder 201 and register 205 are enabled by a logic 1 signal through a common control line 209, this signal being generated at appropriate times by a Clear Adder Register (CAR) control unit 211.

From the foregoing, it is seen that the first seven decades of the register 205 serve as an accumulating register for the data produced at the outputs of the adder 201. The remaining four decades of the register, the decades 8-11, form a "overhanging" register whose function is temporarily to store the contents of the "accumulating" decades 1-7 of the register 205. As each successive number is applied to the addend inputs of the adder 201, that number is added during the following adder cycle to the sum accumulated in the accumulating decades of the register 205. Thus, considering the adder 201 and the register 205 as a single unit, with each successive number signaled at the addend input terminals of the adder, a new subtotal is formed, one adder cycle later at the outputs of the accumulating decades of the register 205 and it is these outputs, labeled AOT-1 through AOT-7 which comprise the output of the digital adder formed of the adder 201 and the register 205.

Means are also provided, in the form of a flip flop 213, for indicating the sign of the number stored in the register 205. The flip flop 213 may be of the same type as those used elsewhere in the system and is operated as a "toggling" type which changes its state each time a pulse is applied at its CP input. To this end, both the J and the K inputs of the flip flop 13 are connected to a source of logic 1 voltage. Toggling pulses are applied to the CP input of the flip flop from two sources through an OR gate 215. One of these sources is the particular system which is used to cause modification of successive numbers in accordance with the invention and will be explained in detail subsequently. Suffice it to say that this source provides its toggling signal to the OR gate 215 over the line 217. The second source of toggling signals is the Subtract Control 219 whose principal function is to instruct the adder 201 to perform either like sign addition or unlike sign addition. Such a subtract control network is described in detail in applicant's copending patent application entitled "Readout System for Selective Display of Digital Data on Time-Shared Conductors," Ser. No. 618,699, filed on Feb. 27, 1967. Knowledge of the details of such a subtract control is not necessary for an understanding of the invention. The following brief description is offered to aid in understanding the manner in which the adder operates.

Whether the adder should work in the add mode (termed "like sign addition") or the subtract mode (termed "unlike sign addition") is determined on the basis of three criteria. The first criterion is whether the addend should be algebraically added to the augend or whether it should be subtracted therefrom. The second criterion is the sign of the addend, and the third criterion is the sign of the augend. Normally, the adder 201 operates in the "add" mode. The adder mode control network, here called the Subtract Control 219 includes a set of logic gates which produce a control signal in response to selected combinations of the three criteria referred to above causing the adder to operate in the subtract mode. The operation of these gates may be summed up by stating that, in response to signals fed to them, they will cause the adder 201 to operate in the subtract mode under the following two conditions: (1) if the addend and augend are of like sign, but the first is to be algebraically subtracted from the second (although the terms subtrahend and minuend are usually employed when discussing subtraction, for sake of simplicity the terms addend and augend are here employed for both addition and subtraction), and (2) if the addend and augend are of unlike sign and the first is to be algebraically added to the latter.

The first criterion, whether the addend is to be added to the augend or whether it is to be subtracted therefrom, is signaled on the FORCE SUBTRACT input terminal 221 of the subtract control 219. Such a FORCE SUBTRACT signal is derived from the Program Step Generator during the program step when it is desired that a subtracting operation be performed. The second criterion, the sign of the addend which appears at the addend input terminals of the adder 201, is usually made part of the data group by which a given number is signaled at the inputs of the adder. In the present application of the adder 201, this input need not be of concern since the only numbers which are applied at the addend input terminals are those received from the Digital Catchers 51a–d and these numbers are always of positive sign. Consequently, it may be assumed for purposes of this explanation that a logic 1 signal is never applied at the AIT-input terminal of the subtract control 219. Finally, the third criterion, the sign of the number produced by the adder during a given adder cycle and signaled on its AOT outputs is indicated on the Q output of the sign flip flop 213. Thus, according to the convention followed in the illustrated adder, the flip flop 213 applies a logic 1 voltage level through its Q output and over line 223 to the subtract control 219 when the sign of the number stored in the register 205 is negative. Conversely, when the sign of the number stored in the register 205 is positive, the logic level of the signal appearing on the line 223 is "0."

From the foregoing it was seen that the state of the sign control flip flop 213 is partly determinative of whether the subtract control 219 will direct the adder 201 to add or subtract during the next adder cycle. The converse is also true, and the decision made by the subtract control circuit 219 will determine whether the flip flop 213 is to remain in the same state during the next adder cycle or whether it should be toggled to its opposite state. The rules followed to determine whether or not to toggle the sign flip flop 213 are complex, and need not be understood here. They are explained in the copending application referred to above. It is sufficient to note that the flip flop 213 will be caused to change its state under the appropriate circumstances. For example, if the number stored in the register 205, i.e., the augend, is smaller than the number received in the adder 201 on its addend input lines and if the addend received is to be subtracted from the augend stored, the state of the flip flop 213 will be reversed since obviously the sign of the remainder will be different from that of the stored augend.

The accumulating register 205 is also a shift register with gated flow paths between adjacent decades of the register to permit lateral transfer of information. Means are provided, in the form of a shift control 225, to shift the contents of the decade of the register 205 either left or right. Appropriate control signals are applied to each of the decades 1 through 11 of the registers 205 over a SHIFT RIGHT control line 227 and a SHIFT LEFT control line 229.

To prevent writing of information into the register 205 while its contents are being shifted, the WRITE signal needed to open the register input gates is gated through a NO SHIFT gate 230, enabled by the inverted SHIFT LEFT and SHIFT RIGHT signals. Only in the absence of shift signals will the register input gates be opened by a gated WRITE signal on line 232. It will also be noted that it is only by means of information shifted to the right from the decades 1 through 7 that the decades 8 through 11 of the overhanging register can receive data.

(c) Operation of the apparatus in performing the method

Turning now to the series of calculations performed by the compositor unit 83 to build up a composite number from the individual numbers stored in the Digital Catchers 51a–d, reference will be made to Table I. As part of the table, are shown the adder 201 and the register 205 in block form. Situated above decades 5, 6 and 7 of the adder 201 in Table I are the four registers 53a–d. Stages C, B, and A of the registers are aligned with decades 5, 6 and 7 of the adder 201 indicating that data from all of the A stages of the registers are entered into the addend inputs of decade 7 of the adder and that data from the B and C stages are entered into decades 6 and 5 of the adder 201.

Shown below the block representation of the adder and register are eleven columns of figures aligned with the eleven decades of the register. In a, twelfth, column, to the left of the preceding eleven columns, appears the sign of the numbers stored in the register which in the heading "Program Step and Adder Cycle." To the left of the numbers in each row is a brief explanation of what the numbers are and where they are during a given adder cycle. To the right of the figures in each row is the operation which is performed by the compositor 83 during the particular program step represented by that row.

TABLE I

|  | C | B | A |  |
|---|---|---|---|---|
| 53a | 0 | 9 | 0 | Fine Register. |
| 53b |  | 8 | 8 | MF Register. |
| 53c |  | 1 | 0 | MC Register. |
| 53d |  | 8 | 9 | C Register. |

AIT  −1 −2 −3 −4 −5 −6 −7
     ↓  ↓  ↓  ↓  ↓  ↓  ↓
      1  2  3  4  5  6  7    ─Overhanging Register
201            ADDER
205     ±   ACCUMULATING REGISTER
     ↓  ↓  ↓  ↓  ↓  ↓  ↓
AOT −1 −2 −3 −4 −5 −6 −7

| Description | Sign | 1 | 2 | 3 | 4 | 5 | 6 | 7 | A | B | C | — | Program | Program step and adder cycle Number |
|---|---|---|---|---|---|---|---|---|---|---|---|---|---|---|
|  |  |  |  |  |  |  |  |  |  |  |  |  | CAR | 121 |
| Digitized fine resolver output, in adder | + | 0 | 0 | 0 | 0 | 0 | 9 | 0 |  |  |  |  | Read Fine Reg | 122 |
|  | + | 0 | 0 | 0 | 0 | 0 | 0 | 9 | 0 | 0 | 0 | 0 | Shift Register Right One | 123 |
|  | + | 0 | 0 | 0 | 0 | 0 | 0 | 0 | 9 | 0 | 0 | 0 | Repeat | 124 |
| Overlapping digit of M.F. digitizer, in adder | − | 0 | 0 | 0 | 0 | 0 | 0 | 8 | 9 | 0 | 0 | 0 | Subtract-Read M.F. Reg. A | 125 |
| Overlapping digit error, in register | − | 0 | 0 | 0 | 0 | 0 | 0 | 8 | 9 | 0 | 0 | 0 | Determine whether AOT-7>4 | 126 |
| Tens complement of overlapping digit error, in register. | + | 0 | 0 | 0 | 0 | 0 | 0 | 2 | 9 | 0 | 0 | 0 | If yes, tens complement and change sign. | 127 |
| Unconformed M.F. digitizer output, in adder | + | 0 | 0 | 0 | 0 | 0 | 8 | 8 | 9 | 0 | 0 | 0 | Read M.F. Regs. AB | 128 |
| Conformed M.F. digitizer output, in register | + | 0 | 0 | 0 | 0 | 0 | 9 | 0 | 9 | 0 | 0 | 0 |  | 129 |
|  | + | 0 | 0 | 0 | 0 | 0 | 0 | 9 | 0 | 9 | 0 | 0 | Shift Register Right One |  |
| Overlapping digit of M.C. digitizer, in adder | − | 0 | 0 | 0 | 0 | 0 | 0 | 0 | 0 | 9 | 0 | 0 | Subtract-Read M.C. Reg. A | 130 |
| Overlapping digit error, in register | + | 0 | 0 | 0 | 0 | 0 | 0 | 9 | 0 | 9 | 0 | 0 | Determine as in Step 126 | 131 |
| Tens complement of overlapping M.C. digit error | − | 0 | 0 | 0 | 0 | 0 | 0 | 1 | 0 | 9 | 0 | 0 | If yes, proceed as in Step 127 | 132 |
| Unconformed output of M.C. digitizer, in adder | + | 0 | 0 | 0 | 0 | 0 | 1 | 0 | 0 | 9 | 0 | 0 | Read M.C. Regs. AB | 133 |
| Conformed output of M.C. digitizer, in register | + | 0 | 0 | 0 | 0 | 0 | 0 | 9 | 0 | 9 | 0 | 0 |  | 134 |
|  | + | 0 | 0 | 0 | 0 | 0 | 0 | 0 | 9 | 0 | 9 | 0 | Shift Register right one |  |
| Overlapping digit of coarse digitizer, in adder | − | 0 | 0 | 0 | 0 | 0 | 0 | 9 | 9 | 0 | 9 | 0 | Subtract-Read coarse Reg. A | 135 |
| Overlapping digit error, in register | + | 0 | 0 | 0 | 0 | 0 | 0 | 9 | 9 | 0 | 9 | 0 | Determine as in Step 126 | 136 |
| Tens complement of overlapping digit error in coarse digitizer. | + | 0 | 0 | 0 | 0 | 0 | 0 | 1 | 9 | 0 | 9 | 0 | If yes, proceed as in Step 127 | 137 |
| Unconformed coarse digitizer output, in adder | + | 0 | 0 | 0 | 0 | 0 | 8 | 9 | 9 | 0 | 9 | 0 | Read coarse Regs. AB | 138 |
| Conformed coarse digitizer output, in register | + | 0 | 0 | 0 | 0 | 0 | 9 | 0 | 9 | 0 | 9 | 0 |  | 139 |
|  | + | 0 | 0 | 0 | 0 | 9 | 0 | 9 | 0 | 9 | 0 | 0 | Shift Left One |  |
|  | + | 0 | 0 | 0 | 9 | 0 | 9 | 0 | 9 | 0 | 0 | 0 | Shift Left One | 140 |
|  | + | 0 | 0 | 9 | 0 | 9 | 0 | 9 | 0 | 0 | 0 | 0 | Shift Left One | 141 |
| Composite digitizer output | + | 0 | 9 | 0 | 9 | 0 | 9 | 0 | 0 | 0 | 0 | 0 | Shift Left One | 142 | more detailed showing of the compositor 83 in FIG. 4c is shown to be produced by the sign flop-flop 213, but which in the simplified block diagram of Table I is merely shown as part of the register 205. The columns of figures are divided into successive rows, with a new set of figures being shown in each row and each row representing a different adder cycle associated with successive program steps, shown in the rightmost column of the table under the heading "Program Step and Adder Cycle."

The first operation performed by the compositor unit 83 in carrying out the invention is to clear the register 205, and this is done on program step 121 by means of the CAR control 211 (FIG. 4c)4 which applies a logic 0 level voltage over the CAR control line 209 to all of the CAR gates 207–1 through 207–7. While not shown, it will be understood that the CAR control 211 contains appropriate programming gates whose inputs are connected to that combination of output terminals of the Program Step Generator 79 which concurrently produce logic 1 level signals during program step 121.

Once the register decades 1 through 7 of the register 205 have been cleared, the adder 201 is ready to receive the first number on its addend inputs. Accordingly, during program step 122 the numbers stored in the storage register 53a of the Fine Digital Catcher 51a the X axis digitizing period are gated through READ gates 85a onto trunk lines 91, 93 and 95 which are connected to the three lowest order decades, decades 7, 6 and 5, of the digital adder 201. The gating signal for opening the READ gates 85a during program step 122 is produced by a programming gate 233 (FIG. 4b) whose inputs are respectively connected to the 100, the 20, and the 2 output terminals of the hundreds, tens, and units code converters 145, 143, and 141. The output of programming gate 233 is applied to the control inputs of the READ gates 85a through an OR gate 235 which is provided so that timing signals may be applied to the READ gates 85a during subsequent time periods associated with reading numbers from the register 53a after digitizing of the Y and Z axis numbers.

Thus during the adder cycle associated with program step 122 the digitized output of the fine resolver will have been entered into decades 5, 6 and 7 of the adder. It is the general scheme of the method here performed that during a subsequent program step, the contents of the medium fine storage register 53b will be transferred to the digital adder and that the lowest order digit of that number will be subtracted from the highest order digit of the number transferred from the fine storage register 53a. These two digits are of corresponding digital significance. Therefore, in order to bring these digits of corresponding digital significance into alignment in the adder, the number deposited in the adder 201 during adder cycle 122 must be shifted to the right by two decade positions. Accordingly, as part of the next adder cycle, No. 123, the number which had been deposited in the adder 201 in the previous adder cycle is automatically transferred into the register 205, and is also shifted one position to the right under the control of the shift control unit 225 (FIG. 4c) which applies the appropriate program signal over its output line 227. Another shift to the right is performed during the next adder cycle 124 so that at the end of that adder cycle, the highest order digit of the number 090 received from the fine register 53a appears in the decade 7 of the register 205 while the two lower order digits 90 of the number are stored in decades 8 and 9 of the overhanging portion of the register 205.

The next step in the method carried out according to the invention is to subtract the lowest order digit of the next higher order number, stored in the medium fine storage register 53b from the highest order digit of the lowest order number which is now stored in decade 7 of the register 205. Accordingly, during the next program step, No. 125, the overlapping (i.e., corresponding order) digit stored in stage A of the storage register 53b of the Medium Fine Digital Catcher 51b is gated through the READ gates 85bA through the trunk lines 91 to the addend input of decade No. 7 of the adder 201. It will be noted in FIG. 4d, that "split" gating is employed in each of the three Digital Catchers 51b through 51d, that is, the READ gates 85b–d are split into two groups in each Catcher so as to permit separate readout of the lower order digit of the number stored in each register first and to provide for concurrent readout of the total number stored in the register subsequently.

Figure 4D:
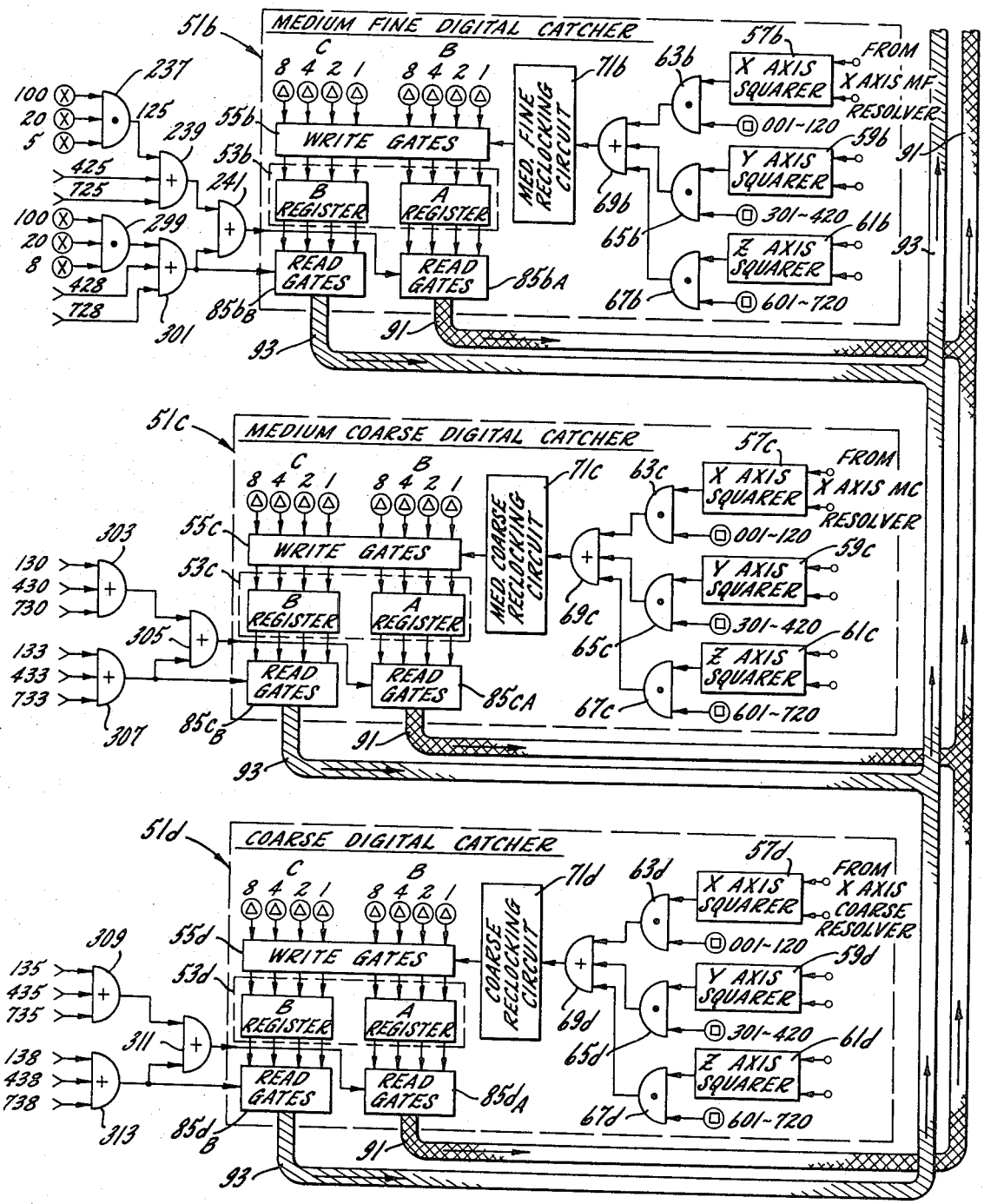

The gating signal for opening the READ gates 85bA during program step 125 is produced by a program gate 237 shown in FIG. 4d to the left of the Medium Fine Digital Catcher 51b having three inputs respectively connected to outputs 100, 20 and 5 of the converters 145, 143 and 141. The output of the program gate 237, which is a logic 1 voltage level appearing during program step 125, is gated to the READ gates 85bA through a first OR gate 239 and a second OR gate 241 whose functions will become apparent as this description proceeds. The digit thus entered into the 7 decade of the adder 201 is entered in the "subtract" mode in order that the adder might subtract it from the number previously stored in the register 205. Consequently, a logic 1 pulse is applied during program step 125 to the FORCE SUBTRACT input terminal 221 of the subtract control 219. This pulse may be derived from the same program gate 237 used to gate the contents of the medium fine register 53b, section A during the program step. Thus, at the end of program step 125 and during the associated adder cycle 125 the lowest order digit, an 8, of the number stored in the storage register 53b of the Medium Fine Digital Catcher 51b has been deposited in the subtract mode in decade 7 of the adder 201.

Upon application of the next clocking pulse to the adder, that is, during the next adder cycle 126 the digit 8 just deposited in the adder 201 is subtracted from the overlapping digit 0 which was deposited during program step 124 in decade 7 of the register 205. The results appears in decade 7 and is 8 with its sign being negative, this being indicated in the sign column.

Now, a determination must be made as to whether or not this remainder is in absolute value greater than the predetermined integer chosen, here 4. This determination is made during program step 126, the same adder cycle in which the overlapping digit error was formed in the register 205. Appropriate means for making this determination are provided in the compositor 83 in the form of a logic network 243 labeled "Means for Detecting $AOT-7>4$." It is understood that it is on the output line AOT-7 that the contents of the decade 7 of the register 205 are signaled and it is on these lines therefore that the magnitude of the overlapping digit error is signaled during adder cycle No. 126.

Within the detecting means 243, means are provided for storing an indication that the overlapping digit is greater than 4 if such an indication is received during program step 126 and for this purpose a J–K flip flop 245 is provided. The J input of the flip flop 245 is qualified through an AND gate 247 and a second AND gate 249 is provided for gating a qualifying signal to the K input of the flip flop. Each of the AND gates 247 and 249 has one input connected to the output of an OR gate 251 which in turn receives the outputs of several program gates during different program steps. One of these signals occurs during program step 126. Only during this program step and others during which a gating signal is applied through the OR gate 251 can the flip flop 245 possibly be qualified.

Means are also provided in the detector 243 for producing a signal when the number signaled on the AOT-7 lines of the register 205 exceeds 4. It consists of AND gates 253 and 255 and of the OR gate 257. The AND gate 253 has two inputs, respectively connected to the 1 bit and the bit output lines of the AOT-7 output trunk line of decade 7 of the register 205. Consequently, it produces a logic 1 level signal only if the number signaled on the AOT-7 lines is 5 or 7. AND gate 255 also has two inputs, respectively connected to the 2 bit and 4 bit output lines of the AOT-7 trunk so that it produces a logic 1 level signal only when the number stored in decade 7 of the register 205 and signaled on its AOT-7 lines is 6 or 7. The outputs of AND gates 253 and 255 are applied to two of the inputs of OR gate 257 and a third input of the OR gate is connected to the 8 bit line of the AOT-7 group of lines. Consequently, a logic 1 signal will appear at the output of OR gate 257 if the number signaled at the output of decade 7 of the register 205 is between 5 and 9 inclusive, i.e., greater than 4. This output is applied directly to a second input of the AND gate 247 so as to qualify the J input of flip flop 245 during program step 126 if and only if the number signaled on lines AOT-7 exceeds 4. This signal, labeled "$AOT-7>4$" is inverted by means of an inverter 259, and thus inverted, is applied to the second input of AND gate 249 so as to qualify the K input of flip flop 245 during program step 126 if the number signaled on lines AOT-7 is not greater than 4.

To provide the pulses for driving flip flop 245, the program clock pulses taken from the PCP terminal 148 of the A decade counter 103 are delayed by means of a delay element 261 in order to compensate for the difference in timing between adder cycles and program steps, and the delayed PCP pulses are applied to the CP input of the flip flop 245.

Thus, toward the end of program step 126 and of any other program step in which a programming pulse is applied to the OR gate 251, the flip flop 245 will become set if the number signaled on the lines AOT-7 exceeds 4 and will be reset if the number does not exceed 4 so that the condition $AOT-7>4$ is signaled by a logic 1 level voltage on the Q output of the flip flop 245 during the following program step 127. The voltage appearing on the Q output of flip flop 245 is gated through an AND gate 262 which is opened during program step 127 by a gating pulse produced by a programming gate (not shown) and applied to an input of the AND gate 262 through an OR gate 264. It is the logic "1" output gated through AND gate 262 during program step 127 which is the output of the detect $AOT-7>4$ circuit 243.

The next step in the process is to alter the entire number stored in the medium fine storage register 53b until its overlapping digit conforms to the corresponding digit of the number taken from the fine storage register 53a. Whether to increase the number or decrease it to bring about this conformance is determined on the basis of the size of the remainder produced by the previous operation, i.e., the difference between the overlapping digits which have been compared.

If the size of the remainder is greater than 4, then the number taken from the storage register 53b should be changed in a sense which is opposite to the sign of the remainder produced by the previous operation to bring about conformance of overlapping digits. On the other hand, if the remainder did not exceed 4, then the number taken from the medium fine register 53b should be changed in the same sense as the sign of the remainder until conformance of overlapping digits is achieved. Since the overlapping digit error, i.e., the remainder, produced by the subtracting operation performed during adder cycle 125 of the present example was greater than 4, the change in the number received from the medium fine register 53b should be in a sense opposite to the sign of the remainder. Since the sign of the remainder was minus, the number taken from the medium fine register 53b will have to be altered in a positive sense and the amount of the alteration will have to be 2, which is the tens complement of the remainder. Indeed, it may be verified upon brief reflection that this will always be the case and that whenever the alteration is to be in a sense which is opposite to the sign of the remainder, the magnitude of the alteration will have to be the tens complement of that remainder. Consequently, means are provided for entering a number during the adder cycle following the determination of the magnitude of the remainder whereby, if the magnitude of the remainder was greater than 4 there will automatically be deposited in the register 205 the negative of the tens complement of the remainder, i.e., of the overlapping digit error, so that the number next entered from the medium fine register 53b may be altered by such a amount.

To deposit in the register 205 the tens complement of the overlapping digit error stored in the register 205 during a previous adder cycle, a data selector unit is interposed between the outputs of the lowest order decade, decade No. 7 of the adder 201, and the inputs of the corresponding decade of the register 205. The data selector unit 263 includes four identical sets of three logic gates, each set being for channeling signals to a different bit stage of decade No. 7 of the register 205. The 8 bit stage of the data selector 263 will be described, being understood that all the other stages are identically constructed. It contains a first AND gate 265, a second AND gate 267, and an OR gate 269 which receives at its inputs the outputs of the AND gates 265 and 267 and which applies the signals which it receives to the 8 bit stage of the No. 7 decade of the register 205. One of the inputs of the AND gate 265 receives the output of the 8 bit stage of the lowest order decade of adder 201 and applies that signal to the OR gate 269 and through it to the register 205 when the gate 265 is enabled by a control signal applied to its second terminal. Thus, speaking now collectively of the four stages of the data selector 263, there are provided a set of four AND gates corresponding to AND gate 265 which, when enabled, apply the signals appearing at the outputs of decade 7 of the adder 201 to the inputs of decade 7 of the register 205.

The AND gate 267 receives its input from a tens complement circuit 271 and, when enabled, applies that output to the 8 bit stage of decade 7 of the register 205. Corresponding AND gates in the 4, 2 and 1 bit stages of the data selector 263 apply, when they are enabled, three other outputs of the tens complement circuit 271 to the 4, 2 and 1 bit stages of decade 7 of the register 205.

When it is desired to insert the negative of the tens complement of the overlapping digit error into the same decade, decade No. 7, of the register, wherein the overlapping digit error was previously stored, the AND gate 267 and the other three AND gates corresponding thereto in the data selector 263 are enabled over a control line 273, which is energized through a delay element 275 by the signal produced by the "$AOT-7>4$" detecting network 243. The delay is again to retime the signal produced by the detector 243 with the cycles of the adder. At the same time that the AND gate 267 and the corresponding AND gates of the data selector 263 are enabled to apply the outputs of the tens complement circuit 271 to the inputs of decade 7 of the register 205, the AND gate 265 and other AND gates corresponding to it in the data selector 263 are disabled from transmitting signals from the adder 201. A logic 0 level signal is applied to them over line 277, produced by an inverter 279 which generates the logic 0 level signal so long as there is a logic 1 level signal on the line 273.

A suitable tens complementing circuit is shown in FIG. 9. It should be observed that the circuit is simplified due to the fact that only numbers which are greater than 5 need to be complemented, since a tens complement is to be produced only when the overlapping digit error is greater than 4.

For sake of brevity, the circuit 271 will not be described in detail. Instead the outputs of each of the logic gates which make up the circuit are labeled so that the manner in which the circuit operates may be verified by mere inspection. One example will be given. Assume that the number received by the circuit is 6, signaled by a logic 1 voltage level at the TRUE 2 and TRUE 4 inputs. The voltage on the TRUE 4 input cannot go through AND gate 281 of the circuit since there is no signal on the TRUE 1 input needed to open that gate. The signal is also applied to AND gate 283, however, and this AND gate is opened because its other input receives the inverted output of AND gate 281 and, since that AND gate remained disabled, its inverted output is a logic 1. Thus a logic 1 level appears at the output of AND gate 283 which is the COMPLEMENT 4 output of the circuit. No output appears at the COMPLEMENT 8 output, that output being connected to ground. Nor does an output appear on the COMPLEMENT 1 output of the circuit since that output is directly connected to the TRUE 1 input and no signal was applied to that input for the number 6 which is being complemented.

Looking now at the COMPLEMENT 2 output, it is derived from an OR gate 287. One input of this OR gate is fed by an AND gate 289, in turn energized by the TRUE 1 input of the circuit inverted by the inverter 291. With a logic 0 level on the TRUE 1 input, one of the inputs of AND gate 289 receives a logic 1 voltage level. However, the AND gate 289 receives a logic 0 in its other input which is fed by an inverter 293 supplied by the TRUE 2 input of the tens complementing circuit 271. Consequently, the AND gate 289 applies a logic 0 level voltage to one of the inputs of OR gate 287. The other input of OR gate 287 is connected to the output of AND gate 281, and therefore also receives a logic 0 level voltage. Consequently, a logic 0 voltage level is produced at the COMPLEMENT 2 output of the circuit 271.

Summarizing the results of this example, it is seen that having applied a 6 in binary code to the inputs of the tens complementing circuit 271, all outputs except the COMPLEMENT 4 output of the circuit are at logic 0 level and hence the circuit has produced a 4 which is the tens complement of the input. Proper operation of the circuit for the numbers 5, 7, 8 and 9 may be confirmed by a similar analysis.

Returning to adder cycle 127, it was stated that it is the negative of the tens complement of the previously derived overlapping digit error that is to be deposited in the register 205. Since the sign of the number stored in the register 205 is indicated by the sign flip flop 213, means are provided for toggling that flip flop in response to the detection of the condition $AOT-7>4$ by the detector 243. Accordingly, the signal appearing on the line 273 and applied to the data selector unit 263 is also applied, through an AND gate 295 and over a line 297, to an input of the OR gate 215 associated with the sign flip flop 213. A second input of the AND gate 295 is fed by the WRITE signal which is produced by the NO SHIFT AND gate 230 in the absence of any shift signal at its inputs.

Thus, by means of the tens complement circuit 271, the data selector 263, and the sign flip flop 213, the tens complement of the overlapping digit error or remainder produced in decade No. 7 during adder cycle No. 126 has been deposited during adder cycle 127 in the same decade, No. 7, of the register, with the sign changed from negative to positive in response to a signal from the $AOT-7>4$ circuit 243. In other words, there has been produced the negative of the tens complement of the remainder produced by subtracting the lowest order digit of the higher order number stored in the medium fine register 53b from the corresponding order digit of the lower order number stored in the fine register 53a.

During the following program step, No. 128, the total contents of the medium fine register 53b, containing the unconformed output of the Medium Fine Digital Catcher 51b are transferred to the adder 201 over trunk lines 91 and 93. Therefore, during program step 128, both of the READ gates 85bA and 85bB are opened. The gating pulse to open the aforementioned two sets of READ gates 85bA and 85bB is produced by the program gate 299 whose inputs are connected to the 100, 20 and 8 outputs of the code converters 145, 143 and 141 respectively and whose output is connected to the READ gates 85bB through an OR gate 301 and to the READ gates 85bA through OR gates 301 and 241 in tandem.

During the following program step 129, more particularly during that portion of the following program step in which the next adder cycle occurs, the unconformed output deposited in the adder stages 6 and 7 during the previous adder cycle 128 is added to the sign inverted tens complemented overlapping digit error which had been deposited in the register 205 during adder cycle 127. The result stored in decades 6 and 7 of the register 205 is 90 and represents the conformed medium fine digitizer output.

The next step in the process is to compare the lowest order digit of the number stored in the medium coarse register 53c with the corrected highest order digit of the number derived from the medium fine register 53b. Since the comparison process is to take place in the No. 7 decade of the adder 201 and of the register 205, the contents of the register 205 must be shifted to the right in order to bring the highest order digit of the number now in the register 205 into the No. 7 decade of the register. During the next adder cycle No. 129, therefore, the contents of the register 205 are shifted to the right by 1 under the control of the shift control unit 225.

During the following program step No. 130, the digit stored in the A section of the medium coarse register 53c is gated through READ gates 85cA and over the trunk line 91 into the decade 7 addend inputs of the adder 201. A program gate for producing a gating pulse during program step 130 is not shown in view of the detailed showing of such a program gate for opening the READ gate 85bA. Rather, the number 130 is shown on the left of the Medium Coarse Digital Catcher 51c in FIG. 4d to represent the output of such a program gate. This output is applied to the READ gates 85cA through a pair of cascade connected OR gates 303 and 305.

To cause the digit just entered into decade 7 of the adder 201, and representing the lowest order digit of the number stored in the register 53c, to be subtracted from the highest order digit of the corrected lower order number, a logic 1 signal is applied to the FORCE SUBTRACT input 221 of the subtract control 219 of the compositor 83 during program step 130. In the next adder cycle, 131, the remainder of the subtraction appears in decade 7 of the register 205 and in the sign flip flop 213. The remainder is +9 and is determined in the same manner as described with respect to adder cycle 126 to be greater than 4. Consequently, during the next step 132 the negative tens complement of the remainder, minus 1, is entered into decade 7 of the register 205 by means of the tens complement circuit 271 and the data selector 263 in the manner described previously in connection with adder cycle 127.

Next, the entire number stored in the medium coarse register 53c and representing the unconformed output of the Medium Coarse Digitizer is gated into decades 6 and 7 of the adder 201 through READ gates 85cB and 85cA over lines 93 and 91 respectively. This occurs in program step 133 and the READ gates 85cB and 85cA are opened by means of a program gate not shown applying a gating pulse to the READ gates 85cB through an OR gate 307 and applying the same gating pulse to the READ gates 85cB through OR gate 305. Thus during the program step 133 the number 10 is transferred from the medium coarse register 53c into the 6 and 7 decades of the adder 201.

During the following adder cycle 134 the sum of the number (−1) stored in the register 205 during adder cycle 133 and of the number (10) received from the medium coarse registers 53c appears in the sixth and seventh decade of the register 205 as the number (+09) representing the conformed output of the Medium Coarse Digitizer. During this same cycle the numbers in the register 205 are further shifted one to the right in order to bring the highest order digit (0) of the conformed number into decade No. 7 of the register 205. Now begins the correction of the number stored in the coarse register 53d.

As a first step, during program step 135 the lowest order digit, stored in the A stage of the register 53d, is "subtract read" into decade 7 of the adder 201. An appropriate gating signal is applied to the READ gates 85dA during program step 135, produced by a program gate (not shown) and applied through a pair of cascade connected OR gates 309 and 311 located on the left of the Coarse Digital Catcher 51d in FIG. 4d. During the same step the same program pulse is also applied to the FORCE SUBTRACT input 221 of the subtract control 219. The result of the subtracting operation is −9 and appears in decade 7 of the register 205 during adder cycle 136. During this same adder cycle, the determination is made by the detecting circuit that the remainder is greater than 4 and as a result, during the adder cycle 137 the compositor 83 proceeds in the same manner as it did in cycles 127 and 132, inserting the negative tens complement of the remainder (+1) into decade 7 of register 205.

During the next program step 138, the contents of the entire coarse register 53d are gated through READ gates 85dA and 85dB over lines 91 and 93 into decades 6 and 7 of the adder 201 respectively. The required gating pulse is produced during program step No. 138 by a program gate (not shown) and is applied directly to the READ gate 85dB through an OR gate 313 and additionally through gate 311 the output of the OR gate 313 is applied also to READ gates 85dA. The resulting sum of the addition performed during adder cycle 138 appears in decades 6 and 7 of the register during the following adder cycle 139 and is 90.

This completes the sequence of successive modifications made to numbers of higher order on the basis of lower order numbers. It will be noted that the digits 090 received from the fine register 53a are now (during adder cycle No. 139) located in decades 9, 10, and 11 of the overhanging portion of the register 205, that the digit 9, representing the corrected or conformed lower order digit of the number received from the medium fine register 53b is in decade 8 of the overhanging portion of the register 205, that the corrected lower order digit 0 of the medium coarse register's number is in the No. 7 decade of the accumulating portion of the register, and that the corrected higher order digit 9 derived from the coarse register 53d is stored in decade 6 of the register 205. Since the decades 8 through 11 of the overhanging portion of the register do not have outputs, the contents of the register 205 must be shifted to the left four times until all of the digits which had been in the overhanging portion of the register 205 have been transferred to the left into the accumulating portions of the register 205. Therefore, during each of the program steps 139-142, under control of signals applied to the register 205 over the SHIFT LEFT line 229 by the shift control 225, the digits stored in the register during adder cycle 139 are shifted one decade to the left. This brings the complete number 90,9090 into decades 2 through 7 of the accumulating register, and the number is signaled over the output trunk lines AOT-2 through AOT-7. Thus, during the time period represented by program steps 121 through 142 the digitized signals of the X axis resolvers 27a-27d have been conformed and combined into a single number representing position of the saddle 16 and the cutting tool 14 carried by the saddle within all of the ranges represented by the respective resolvers. The foregoing example involves in each case an absolute difference greater than 4 when the lowest order digit from one catcher 51b, 51c, 51d is subtracted from the highest order digit of the catcher 51a, 51b, 51c respectively for the next finer resolver. As noted above, when such difference or remainder does not in magnitude exceed +4 or −4, then the lowest order digit value read from a given catcher register is altered in the same sense as the sign of the remainder until it becomes equal to the corresponding highest order digit value of the catcher for the next finer resolver. Consider, merely as an example, that the fine resolver catcher register 53a holds the number 732 and that the medium fine catcher register 53b holds the number 85. From the subtraction performed at step 125 in Table I, the overlapping digit error will be 7−5=+2, which is less than +4. When this occurs, the value of the remainder (here, +2) will be added with the same sign to the lowest order digit of the medium fine catcher number, so that it will become equal to the highest order digit value of the fine catcher number. In this example, 5+2=7, so that the conformed medium fine number will be 87 instead of 85, and the value "7" will be used for the third-to-lowest digit in the composite number ultimately developed.

As seen in Table I, if on program step 126, it is determined that $AOT-7 \leq 4$, then the "yes" for step 127 becomes a "no," and the flip-flop 245 (FIG. 4c) will be reset to its "0" state, producing a "0" logic signal on line 273 and a "1" logic signal on line 277. Thus, on program step 127, the gate 265 (and its counterparts for the 4, 2, 1 bits in DATA SELECTOR 263) will be opened, so that the value of the seventh place digit then signaled on the output terminals of the adder 201 will be sent through the WRITE GATES to the seventh digit place of the register 205. But during the program step 127, the input lines 91-1, -2, -4, -8 of the adder 201 are all receiving "0" logic signals, whereas the input lines 203-1, -2, -4, -8 are receiving, via CAR gates 207-7, logic level signals representing the remainder then held in the seventh digit place of the register 205. The sum of zero plus the remainder is simply the remainder itself, and thus the remainder will be rewritten into the register 205 without any change of sign. Then, on program step 128 when the unconformed medium fine catcher number is read onto the adder input trunk, the latter number will be added to the stored remainder to form the "conformed" medium fine number. In the example given, the fine resolver number of "732" is first stored in the seventh, eighth and ninth digit places of the register 205 at the end of program step 124. On step 125, the "5" of the medium fine catcher number 85 is read into the adder and subtracted from the "7" in the seventh digit place, yielding a remainder of +2. This is then simply rewritten into the register 205 on program step 127, and added to the number "85" during program step 128 to yield in the register a conformed number of 8752. The contents of the register 205 are then shifted one place to the right on program step 129, and the operation as described with reference to Table I continues. In effect, as will be seen, when the overlapping digit error is less than first and second predetermined values (both 4 in this instance) then the final value taken for the overlapping digit place is simply the value of that digit as it appears in the number caught for the finest of the two resolvers being compared; and indeed, instead of adding the remainder found from subtraction of the two values of the overlapping digit values, the value of the overlapping digit for the lowest order number may be directly used.

Means are also provided for performing the same operation by means of the compositor 83 during program steps 421 through 442 on the numbers stored in the registers 53a-53d as a result of digitizing the Y axis resolvers 29a-29d and during the program steps 721 through 742 on the numbers stored in the registers 53a-53d as a result of digitizing the Z axis resolvers 31a-31d. Thus the adder is cleared during each of adder cycle periods 421 and 721 by means of the CAR control 211. The READ gates 85a of the fine register 83a are opened during each of the program step numbers 422 and 722 by gating pulses produced by program gates 231 and 233 both of which supply their outputs through the OR gate 235 to the control inputs of the READ gates 85a.

During adder cycle Nos. 423 and 424 as well as 723 and 724, the register 205 is shifted to the right by one decade. The READ gates 85bA of the Medium Fine Digital Catcher 51b are "subtract read" during program steps 425 and 725, appropriate program pulses being supplied to the control inputs of the READ gates by means of program gates (not shown) through OR gates 239 and 241, and to the FORCE SUBTRACT line 221.

Flip flop 245 of the $AOT-7 > 4$ circuit 243 is then qualified during program steps 426 and 726 by programming pulses produced by program gates (not shown) through OR gate 251, and the output of the flip flop 245 of the detector circuit 243 is gated through the output AND gate 262 during each of the program steps 427 and 727 by pulses produced by program gates (not shown) through OR gate 264.

The contents of registers 85bA and 85bB are read together during each of the program steps 428 and 728 by program pulses produced by program gates (not shown) and applied to the control inputs of the READ gates through OR gates 301 and 241. During each of adder cycles 429 and 729 the contents of the register 205 are shifted one decade to the right and during each of the program steps 430 and 730 the contents of the A stage of the medium coarse register 53c are gated through READ gates 85cA under control of gating pulses produced by program gates indicated by the numbers 430 and 730 through OR gate 303 and OR gate 305. During each of the steps 431 and 731, a gating pulse is applied through OR gate 251 to permit flip flop 245 of the AOT–7>4 circuit 243 to be qualified and the contents of the flip flop 245 are gated out during each of the periods 432 and 732 by means of gating pulses produced by program gates indicated by the numbers 432 and 732 and gated through the OR gate 264.

Continuing with the operation of the compositor during its second and third computing cycles, the contents of the medium coarse register 53c are gated through READ gates 85cA and 85cB during program steps 433 and 733 by means of gating pulses applied through OR gates 307 and 305. During adder cycles 434 and 734, the contents of the register 205 are shifted one decade to the right and during program steps 435 and 735, under the control of gating pulses applied to the READ gates 85dA through CR gates 309 and 311, the contents of the A stage of the coarse register 53d are "subtract read" into the adder 201 whose FORCE SUBTRACT input terminal 221 also receives a logic 1 signal during these program steps. The AND gates 247 and 249 of the detector 243 are again enabled during each of the program steps 436 and 736 through OR gate 251, and the contents of the flip flop 245 of the same circuit are gated through the output AND gate 262 of the detector 243 by gating pulses during each of program steps 437 and 737, these pulses being fed to the AND gate through OR gate 264. During the final portion of the calculating process following each of the digitizing periods devoted to converting the Y and Z axis resolver outputs, the coarse registers 53d are read through READ gates 55dA and 55dB. The READ gates are enabled by gating pulses applied through OR gate 313 and OR gate 311. Finally, during each series of adder cycles 439, 440, 441, 442 and 739, 740, 741, and 742 the contents of the register 205 are stepped four decades to the left, making available, at output terminals AOT–2 through AOT–7 the composite numbers representing the Y and Z axis positions.

CONCLUSION

From the foregoing, it is seen that there has been brought to the art of digital position detecting and indicating a system which is capable of producing superior results while reducing the amount of equipment required through time-sharing techniques. The position of elements along several axes, and within a large dimensional range along each axis, is digitally signaled with high precision.

The phase variable outputs of several series of resolvers, each series signaling position along a different axis, are converted into digitally signaled numbers, by means of a single digital sweep generator, and a single series of devices for capturing its count states at selected times, thus reducing the amount of equipment required in machines wherein position is to be indicated along several axes to a fraction of what would otherwise be required.

The same simplification effected while digitizing position-representative analog signals is also achieved in the equipment which combines individual numbers, representing the outputs of respective resolvers in a given series, into a single composite number. Thus a single compositor unit is operative to combine numbers produced during different periods in the time-sharing scheme into the desired composite numbers and to modify the numbers derived from the different resolvers in such a manner that numbers of successively greater digital significance are conformed to the more precise numbers of lower digital significance.

Performance of all of the modifications and combinations of numbers in a separate but single compositor unit rather than in the several components of the system wherein numbers are captured from the digital sweep generator effects a further simplification of equipment.

In addition to its advantages of superior accuracy and multiple use of common elements, performance of the system is also greatly improved by its capability to function at machine speeds so high that the frequency of the phase variable signals produced by resolvers to indicate position is significantly reduced.

In summary, by virtue of its features the system which has been described can operate at high machine speeds and perform an increased number of functions while producing better results than have been achieved by systems heretofore available.

I claim as my invention:

1. A method of digitally signaling the position of a movable element including the steps of
   (a) producing a digital sweep formed of signal digitally representing a reference number which during successive time intervals repeatedly and cyclically changes from a first to a second predetemined value by uniform increments at uniformly time-spaced instants,
   (b) producing first and second recurring signals, each indicative by its phase angle relative to the cycling intervals of said reference number of the position of the movable element within successively larger ranges and with successively less accuracy,
   (c) deriving from said digital sweep and separately storing, first and second digitally signaled multidigit numbers representing the phase angles of said first and second recurring signals, the lowest order digit of said second number corresponding in significance to the highest order digit of said first number,
   (d) subtracting the lowest order digit of the second number from the highest order digit of the first number,
   (e) modifying the value of said second number by adding to it an amount equal to the remainder if said remainder is not greater than at least one predetermined integer, and by adding to it the negative of the tens complement of the remainder if said at least one remainder is greater than a predetermined integer, and
   (f) combining said first number and second number as modified into a composite digitally signaled number representing the position of said movable element within the range associated with the second of said recurring signals but with added accuracy derived from the first of said recurring signals.

2. The method of claim 1 wherein said numbers are decimal numbers, and said predetermined integer is four.

3. A method of digitally signaling the position of a movable element along a plurality of axes including the steps of
   (a) producing a digital sweep formed of signals digitally representing a reference number which during successive time intervals repeatedly and cyclically changes from a first to a second predetermined value by uniform increments at uniformly time-spaced instants,
   (b) producing a plurality of signal groups, signals of the respective groups collectively representing the position of the element along respective ones of said axes, each group including first and second recurring signals, each signal indicative by its phase angle relative to the cycling intervals of said reference number of the position of the movable element within successively larger ranges each of which includes ten of the next smaller ranges laid end to end, (c) successively digitizing each group of signals by deriving from said sweep, during a different time interval for each group of signals, first and second digitally signaled, multi-digit decimal numbers respectively representing the phase angles of said first and second recurring signals in each group, the lowest order digit of the second number in each instance corresponding in significance to the highest order digit of said first number, (d) after digitizing each given group of signals and before digitizing the next group of signals
  (1) subtracting the lowest order digit of the second number from the highest order digit of the first number,
  (2) modifying the value of said second number by adding to it an amount equal to the remainder if said remainder is not greater than a predetermined integer, and by adding to it the negative of the tens complement of the remainder if said remainder is greater than a predetermined integer, and
  (3) combining said first number and said second number as modified into a composite digitally signaled number representing the position of said movable element along the axis represented by said given group of signals within the range associated with the second of said recurring signals but with the added accuracy derived from the first of said recurring signals.

4. A method of forming a composite number from a series of successively higher order multi-digit binary coded decimal numbers wherein the highest order digit of a given order number has the same digital significance as the lowest order digit of the next higher order number, successively higher order numbers of the series representing position of an object along a given axis within successively larger ranges, each range of a given size including an integral number of ranges of the next smaller size laid end to end along said axis, including the steps of (a) subtracting from the highest order digit of the lowest order number the lowest order digit of the next higher order number of said series and producing a remainder, (b) altering the value of said next higher order number in an opposite sense to the sign of said remainder until the lowest order digit of said next higher order number is the same as the corresponding order digit of the lowest order number if the remainder is greater than at least one of a group of predetermined integers and altering the value of said next higher order number in the same sense as the sign of the remainder until said corresponding order digits are equal if said remainder is not greater than at least one of said group of predetermined integers, (c) subtracting from the highest order digit of the said next higher order number, as altered, the corresponding digit of the next succeeding higher order number and producing a second remainder, (d) altering the value of said next succeeding higher order number in an opposite sense to the sign of said second remainder until the lowest order digit of said next succeeding higher order number is the same as the corresponding order digit of said altered number if said second remainder is greater than at least one of said group of predetermined integers and altering the value of said next succeeding higher order number in the same sense as the sign of said second remainder until the corresponding order digits of the numbers are equal if said second remainder is not greater than at least one of said group of predetermined integers, (e) repeating steps (a) through (d) for each successively higher order number of said series until the highest order number in the series beyond said next higher order number has been corrected, and (f) combining said corrected numbers into a composite number.

5. The method of claim 4 wherein said integral number of ranges is ten, said multi-digit numbers are decimal numbers, and said group of predetermined integers includes four and five.

6. In a numerical control system, apparatus for digitally signaling the position of a movable element along a given line comprising in combination (a) means for generating a digitally signaled sweep regularly recurring during successive time intervals, (b) means for producing a first recurring signal indicative by its phase angle relative to the cycling intervals of said sweep of the position of the movable element along said line within a predetermined range, (c) means for producing a second recurring signal indicative by its phase angle relative to the cycling intervals of said sweep of the position of the movable element along said line within a second range which includes an integral number of said first ranges laid end to end along said line, (d) first and second means both responsive to said sweep and individually responsive to said first and second recurring signals responsively, for individually deriving from said sweep and storing first and second digitally signal numbers respectively representing the phase angles of said first and second recurring signals, the lowest order digit of said second number correponding in significance to the highest order digit of said first number, (e) means connected to receive and temporarily store the contents of said first and second means and including
  (1) means for subtracting the lowest order digit of the second number from the corresponding order digit of the first number,
  (2) means responsive to the magnitude of the remainder of said subtraction for altering the value of said second number in an opposite sense to the sign of said remainder until its lowest order digit conforms to the highest order digit of said first number if said remainder is greater than at least one predetermined integer and altering the value of said second number in the same sense as the sign of said remainder until its lowest order digit conforms to the highest order digit of the first number if said remainder is not greater than at least one predetermined integer, and
  (3) means for combining said first number and said second number, as altered, into a composite number representing the position of said movable element along said line within said first and second ranges.

7. In a numerical control system, apparatus for digitally signaling the position of a movable element along a given line comprising in combination (a) means for generating a digital sweep formed of signals digitally representing a reference number which during successive time intervals repeatedly and cyclically changes from a first to a second predetermined value by uniform increments at uniformly time-spaced instants, (b) first signaling means including a rotary resolver powered by a sinusoidal current of the same frequency of recurrence as said digital sweep and geared to said movable element for producing a first recurring signal indicative by its phase angle relative to the cycling intervals of said sweep of the position of the movable element along said line within a predetermined range, (c) second signaling means including a rotary resolver powered by a sinusoidal current of the same frequency of recurrence as said digital sweep and geared to said movable element for producing a second recurring signal indicative by its phase angle relative to the cycling intervals of said sweep of the position of the movable element along said line within a second range which includes an integral number of said first ranges laid end to end along said line, (d) first and second gated storage means, each connected to receive, when enabled, signals representing said digital sweep, (e) first and second conditionally operative means respectively connected between said first signaling means and first gated storage means and between said second signaling means and second gated storage means for enabling, when said conditionally operative means are operative, their associated gated storage means at the instant when their associated signaling means produces a signal having reached a predetermined point along any given cycle thereof, so that first and second digital numbers representative of the respective phase angles of said first and second recurring signals are transferred from said digital sweep generating mean into respective ones of said first and second gated storage means, the lowest order digit of said second number corresponding in significance to the highest order digit of said first number, and (f) means for rendering said conditionally operative first and second means operative for a time period which is longer than the time period of the sinusoidal current powering said first and second signaling means so as to insure proper operation of the apparatus even when high resolver speeds increase the periods of said recurring signals.

8. The apparatus of claim 7 additionally including means connected to receive and temporarily store the contents of said first and second gated storage means and including (a) means responsive to the relative values of said digits of corresponding significance for altering the value of said second number in a proper sense until its lowest order digit conforms to the highest order digit of said first number, and (b) means for combining said first number and said second number, as altered, into a composite number representing the position of said movable element along said line within said first and second ranges.

9. The apparatus of claim 7 additionally including:

(a) a digital adder connected to receive and store according to their significance the signals from said first and second gated storage means, (b) means for causing said adder to subtract said corresponding digit of said second number from said corresponding digit of said first number, and to produce a remainder, and (c) means responsive to the output of the adder to cause the adder to alter the value of said second number in an opposite sense to the sign of said remainder until the corresponding digit of said second number conforms to that of said first number if said remainder is greater than at least one predetermined integer, and to alter the value of said second number in the same sense as the sign of said remainder, until said conformance of corresponding digits is achieved, if said remainder is not greater than at least one predetermined integer.

10. In a numerical control system for machine tools, apparatus for digitally signaling the position of a movable element along each of first and second axes comprising in combination:

(a) means for generating a digital sweep formed of signals digitally representing a reference number which during successive time intervals repeatedly and cyclically changes from a first to a second predetermined value by uniform increments at uniformly time-spaced instants, (b) means for producing a first recurring signal indicative by its phase angle relative to the cycling intervals of said sweep of the position of the movable element along said first axis, (c) means for producing a second recurring signal indicative by its phase angle relative to the cycling intervals of said sweep of the position of the movable element along said second axis, (d) gated storage means having:
  (1) first and second gated control inputs respectively connected to receive said first and second recurring signals, and
  (2) a set of gated signal inputs connected to receive the outputs of said digital sweep generating means, and each of said control inputs, when gated open, causing signals to be entered through said signal inputs at instants when the phase of the recurring signal which it receives reaches a predetermined point along its cycle, (e) means for gating open said first and second gated control inputs respectively during first and second regularly recurring interleaved time periods which correspond to the intervals of said sweep, and (f) means for sequentially reading from said gated storage means in a regularly recurring sequence the signals deposited therein from the digital sweep generating means and representative of the instantaneous position of said movable element along respective ones of said first and second axes.

11. In a numerical control system for machine tools, apparatus for digitally signaling the position of a movable element along each of first and second axes, comprising in combination:

(a) means for generating a digital sweep formed of signals digitally representing a reference number which during successive time intervals repeatedly and cyclically changes from a first to a second predetermined value by uniform increments at uniformly time-spaced instants, (b) means for producing a first pair of recurring signals, the first signal of the pair being indicative by its phase angle relative to the cycling intervals of said sweep of the position of the movable element along said first axis within a predetermined range, and the second signal of the pair being indicative by its phase angle relative to the cycling intervals of said sweep of the position of the movable element along said first axis within a second range which includes an integral number of said first ranges laid end to end along said axis, (c) means for producing a second pair of recurring signals, the first signal of said pair being indicative by its phase angle relative to the cycling intervals of said sweep of the position of the movable element along said second axis within a predetermined range, and the second signal of said pair being indicative by its phase angle relative to the cycling intervals of said sweep of the position of the movable element along said second axis within a second range which includes an integral number of said first ranges laid end to end along said axis, (d) first and second gated storage means:
  (1) said first gated storage means having first and second gated control inputs connected to receive the first signal of said first and second pairs of recurring signals respectively,
  (2) said second gated storage means having first and second gated control inputs connected to receive the second signal of said first and second pairs of recurring signals respectively, (3) said first and second gated storage means each having a set of gated signal inputs connected to receive the outputs of said digital sweep generating means, and (4) each of said control inputs in both of said first and second gated storage means, when gated open, causing signals forming said digital sweep to be entered through the signal inputs of the gated storage means of which they are a part at instants when the recurring signal which they receive reaches a predetermined point along its cycle, (e) means for gating open the first gated control input of said first and second gated storage means during a first series of regularly recurring time periods coinciding with intervals of said sweep and for gating open the second gated control inputs of said first and second gated storage means during a second series of regularly recurring time periods, interleaves with the first series, coinciding with intervals of said sweep, and (f) means for sequentially reading from said first and second gated storage means in a regularly recurring sequence the signals deposited therein from the digital sweep generating means and representative of the instantaneous position of said movable element along respective ones of said first and second axes within said first and second ranges.

12. In a numerical control system for machine tools, apparatus for digitally signaling the position of a movable element along first and second axes, comprising in combination (a) means for generating a digital sweep formed of signals digitally representing a reference number which during successive time intervals repeatedly and cyclically changes from a first to a second predetermined value by uniform increments at uniformly time-spaced instants, (b) first and second means for signaling the position of said movable element along said first and second axes respectively, each means producing a pair of recurring signals, the first signal being representative by its phase angle relative to the cycling intervals of said sweep of position along the respective axis within a first range, and the second signal being representative by its phase angle relative to the cycling intervals of said sweep of position along that axis within a second range which includes an integral multiple of said first ranges laid end to end, (c) first and second digit catching means connected to said digital sweep generating means and respectively responsive, conditionally, to the first and second signals produced by both of said signaling means for deriving from said sweep digitally signaled numbers representative of the phase angles of selected ones of the recurring signals to which they are conditionally responsive, and (d) timing means synchronized with said digital sweep generating means for rendering both of said first and second digit catching means responsive to signals from said first signaling means during a first series of regularly recurring sweep periods and for rendering the same digit catching means responsive to signals from said second signaling means during a second series of regularly recurring sweep periods interspersed with sweep periods of the first series so that there appear in said digit catching means during said first and second series of sweep periods respectively a first and a second pair of digitally signaled numbers respectively representing position of the movable element along first and second axes, the lowest order digit of the second number in each pair corresponding in significance to the highest order digit of the first number of that pair.

13. The apparatus of claim 12 characterized further by the provision of apparatus for forming a composite corrected number from the numbers of each pair produced by said digit catching means and including (a) means connected to receive and temporarily store the contents of said first and second digit catching means, (b) means connected to receive the contents of said storing means for subtracting the lowest order digit of the second number from the corresponding order digit of the first number, (c) means responsive to the magnitude of the remainder of said subtraction for altering the value of said second number in an opposite sense to the sign of said remainder until digits of corresponding order in said first and second numbers are equal, if said remainder exceeds at least one predetermined integer, and for altering the value of said second number in the same sense as the sign of said remainder until said corresponding digits are equal, if said remainder is not greater than at least one predetermined integer, and (d) means for combining said first number and said second number, as altered, into a composite number.

14. Apparatus for digitally signaling the position of movable elements on each of a plurality of axes comprising in combination (a) means for generating a digital sweep formed of signals digitally representing a reference number which during successive time intervals repeatedly and cyclically changes from a first to a second predetermined value by uniform increments at uniformly time-spaced instants, (b) a plurality of series of resolvers and means for electrically energizing them synchronously with said sweep, respective series being geared to represent position of the elements along different axes, successive resolvers of each series being geared to rotate a predetermined fraction of the rotation of the preceding resolver relative to the movements of the movable element, (c) a plurality of digit collecting means, one for each set of correspondingly geared resolvers, each digit collecting means having (1) a storage register with gated signal inputs connected to receive signals produced by said sweep generating means when said inputs are enabled, and (2) control means conditionally responsive to the outputs of each of its associated set of resolvers for enabling the signal inputs of its associated storage register when the signal to which said control means is responsive reaches a predetermined point in its recurring signal cycle, (d) timing means for rendering said control means responsive to the outputs of successive series of said resolvers during successive, regularly recurring periods of said sweep so that there is produced in said storage registers, during each of said successive periods, a series of multi-digit numbers, successive series of said numbers digitally representing the outputs of successive series of said resolvers, the highest order digit of a given order number corresponding to the lowest order digit of the next higher order number in each series of numbers, and (e) means connected to said digital collecting means for (1) receiving the first series of numbers captured in the collecting means and temporarily storing said numbers, (2) subtracting from the highest order digit of the lowest order number the lowest order digit of the next higher order number of said series and producing a remainder, (3) altering the value of the higher order number in an opposite sense to the sign of said remainder until the lowest order digit of said higher order number is the same as the corresponding order digit of the lower order number if the remainder is greater than at least one predetermined integer and altering the value of the higher order number in the same sense as the sign of the remainder until said corresponding order digits are equal if said remainder is not greater than said at least one predetermined integer, (4) subtracting from the highest order digit of the said higher order number, as altered, the corresponding digit of the next higher order number and producing a second remainder, (5) altering the value of said next higher order number in an opposite sense to the sign of said second remainder until the lowest order digit of said next higher order number is the same as the corresponding order digit of said altered number if said second remainder is greater than said at least one predetermined integer and altering the value of said next higher order number in the same sense as the sign of said second remainder until the corresponding order digits of the numbers are equal if said second remainder is not greater than said at least one predetermined integer, (6) repeating steps (e)(2) through (e)(5) for each successively higher order number of said series until the highest order number in the series has been corrected, (7) combining said corrected numbers into a composite number, and (8) repeating steps (e)(1) through (e)(7) during time periods following the capture of successive series of said numbers.

15. A method of forming a composite number from a series of successively higher order multi-digit numbers of a given radix, successively higher order multi-digit numbers of the series having overlapping digits and representing the position of an object along a given axis within successively larger ranges, each range of a given size including an integral multiple of the next smaller ranges, said multiple being integrally related to said radix, including the steps of (a) subtracting from the highest order digit of the lowest order number the overlapping digit of the next higher order number and forming a remainder, (b) altering the value of the non-overlapping digits of the next higher order number in an opposite sense to the sign of the remainder by one unit
  (1) if the value of the remainder exceeds a predetermined amount in the positive sense, and
  (2) if the value of the remainder exceeds a second predetermined amount in the negative sense, (c) combining the altered non-overlapping digits of the higher order number with the full set of digits of the lower order number to create a new number, and (d) repeating steps (a) through (c) for each successively higher order number of said series, until the non-overlapping digits of the highest order number in the series have been altered and combined with the full set of digits of the lower order numbers formed during preceding steps of the method.

16. In a numerical control system, apparatus for digitally signaling the position of a movable element along a given line, comprising in combination (a) means for generating a digitally signaled sweep regularly recurring during successive time intervals, (b) means for producing a first recurring signal indicative by its phase angle relative to the cycling intervals of said sweep of the position of the movable element along said line within a predetermined range, (c) means for producing a second recurring signal indicative by its phase angle relative to the cycling intervals of said sweep of the position of the movable element along said line within a second range which includes an integral number of said first ranges laid end to end along said line, (d) first and second means, both responsive to said sweep and individually responsive to said first and second recurring signals respectively, for individually deriving from said sweep and storing first and second digitally signaled numbers respectively representing the phase angles of said first and second recurring signals, said first and second numbers having at least one pair of digits—one digit in each number—of corresponding significance, and (e) means for deriving from said first and second numbers a composite number representing the absolute position of said movable element within both of said ranges.

17. The combination of claim 16 wherein said means for deriving a composite number includes (a) means responsive to the relative value of said digits of corresponding significance for altering the value of said second number in a proper sense until digits of corresponding significance in said first and second numbers are the same, and (b) means for combining said first number and said second number, as altered, into a composite number representing the position of said movable element along said line within said first and second ranges.

18. The combination of claim 16 wherein said means for deriving a composite number is connected to receive and temporarily store the contents of said first and second means and includes (a) means for subtracting from the highest order digit of said first number the digit of corresponding significance in said second number, (b) means responsive to the magnitude of the remainder of said subtraction for altering the value of said second number in an opposite sense to the sign of said remainder until said digits of corresponding significance in said first and second numbers are the same if said remainder is greater than at least one predetermined integer and altering the value of said second number in the same sense as the sign of said remainder until said digits of corresponding significance are the same if said remainder is not greater than said at least one predetermined integer, and (c) means for combining said first number and said second number, as altered, into a composite number representing the position of said movable element along said line within said first and second ranges.

19. A method of digitally signaling the position of a movable element along a first axis and a second axis including the steps of (a) producing a digital sweep formed of signals digitally representing a reference number which during successive time intervals repeatedly and cyclically changes from a first to a second predetermined value by uniform increments at uniformly time-spaced instants, (b) producing first and second recurring signals indicative by their phase angles relative to the cycling intervals of said reference number of the position of said element along said first axis and said second axis, (c) catching and storing in a register the digital sweep signals at an instant determined by said first recurring signal and during a first of a regular succession of repeating time periods to numerically signal the position of the element along said first axis, (d) transferring from and utilizing during a second of said repeating time periods the signals stored in said register during step (c), (e) catching and storing in said register the digital sweep signals at an instant determined by said second recurring signal and during a third of said repeating time periods to numerically signal the position of the element along said second axis,
(f) transferring from and utilizing during a fourth of said repeating time periods the signals stored in said register during step (e), and
(g) repeating steps (c) through (f) during each repetition of said repeating time periods.

References Cited

UNITED STATES PATENTS

| | | | |
|---|---|---|---|
| 3,175,138 | 3/1965 | Kilroy et al. | 340—347 |
| 3,248,622 | 4/1966 | Kelling | 340—347 |

MAYNARD R. WILBUR, Primary Examiner

J. GLASSMAN, Assistant Examiner

U.S. Cl. X.R.

318—18